US012131622B1

(12) United States Patent
Almurayh et al.

(10) Patent No.: US 12,131,622 B1
(45) Date of Patent: Oct. 29, 2024

(54) SYSTEM AND METHOD FOR ANOMALY DETECTION

(71) Applicant: Imam Abdulrahman Bin Faisal University, Dammam (SA)

(72) Inventors: Abdullah Saeed Almurayh, Dammam (SA); Alaa Yahya Alahmadi, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 70 days.

(21) Appl. No.: 18/311,955

(22) Filed: May 4, 2023

(51) Int. Cl.
*G08B 1/08* (2006.01)
*G08B 25/10* (2006.01)
*H04L 67/1097* (2022.01)
*H04L 67/12* (2022.01)
*H04W 84/18* (2009.01)

(52) U.S. Cl.
CPC .......... *G08B 25/10* (2013.01); *H04L 67/1097* (2013.01); *H04L 67/12* (2013.01); *H04W 84/18* (2013.01)

(58) Field of Classification Search
CPC ..... G08B 25/10; H04L 67/1097; H04L 67/12; H04W 84/18
See application file for complete search history.

(56) References Cited

U.S. PATENT DOCUMENTS

| 2020/0100076 | A1* | 3/2020 | Skaaksrud | ............ G08B 17/10 |
| 2020/0100115 | A1* | 3/2020 | Skaaksrud | ............ B64D 45/00 |
| 2021/0331320 | A1 | 10/2021 | Kobayashi et al. | |
| 2022/0236086 | A1 | 7/2022 | Zafar et al. | |
| 2022/0284582 | A1 | 9/2022 | Yang et al. | |

OTHER PUBLICATIONS

Liu et al. ; Anomaly detection based on machine learning in IoT-based vertical plant wall for indoor climate control ; Building and Environment 183 ; Aug. 24, 2020 ; 13 Pages.

* cited by examiner

*Primary Examiner* — Toan N Pham
(74) *Attorney, Agent, or Firm* — Oblon, McClelland, Maier & Neustadt, L.L.P.

(57) ABSTRACT

An anomaly detection system includes multiple sensors fixed within a user-selected environment to measure environmental conditions and wirelessly transmit data corresponding to the environmental conditions to a main device. The main device includes circuitry encoded with instructions from a trained machine learning model to identify one or more anomalies from the data received from the sensors. The main device transmits data related to the anomalies and the environmental conditions to a cloud storage via a plurality of wired and wireless connections. The cloud storage wirelessly relays the data to a user device. The user device, based on user's feedback, relays a feedback signal, via the cloud storage, to the trained machine learning model, where the feedback signal is incorporated into the trained machine learning model for the purpose of retraining.

19 Claims, 30 Drawing Sheets

Sign Up

Name * test

Surname * testy

Email address * test@email.com

Password *

••••••••••••

SIGN UP

Already a member? Sign in : SIGN IN

User Interface App

Authentication

Sign In

Email address * test@email.com

Password *

••••••••••••

SIGN IN

Not a member yet?
Become a member: SIGN UP

User Interface App

FIG. 3

Settings (current)  Dashboards ▾  Anomaly Detection ▾                                    Sign out Features Settings

| Sensor Type | Sensor ID | Sensor Name | Status | Update Time(s) | Action |
|---|---|---|---|---|---|
| Dust | 7 | My room Dust ˅ | Approved ˅ | 600 ˅ | ⊗ |
| Force | 5 | Chair ˅ | Approved ˅ | 600 ˅ | ⊗ |
| Gas | 9 | Kitchen Gas ˅ | Approved ˅ | 600 ˅ | ⊗ |
| Humidity | 1 | Humy1 ˅ | Approved ˅ | 600 ˅ | ⊗ |
| Light | 3 | My office light ˅ | Approved ˅ | 600 ˅ | ⊗ |
| Soil | 11 | My plant ˅ | Approved ˅ | 600 ˅ | ⊗ |
| Sound | 8 | Living room ˅ | Approved ˅ | 600 ˅ | ⊗ |
| Temperature | 2 | my room Temp ˅ | Approved ˅ | 600 ˅ | ⊗ |
| Vibration | 10 | Safe ˅ | Approved ˅ | 600 ˅ | ⊗ |
| Water | 6 | Water leak ˅ | Approved ˅ | 600 ˅ | ⊗ |

FIG. 5

Anomaly Detection Settings

| Sensor Type | Sensor ID | Status | | Change Environment |
|---|---|---|---|---|
| Dust | 7 | IsolationForest | ˅ | 🔔 |
| Force | 5 | SVM | ˅ | 🔔 |
| Gas | 9 | Cluster | ˅ | 🔔 |
| Humidity | 1 | SVM | ˅ | 🔔 |
| Light | 3 | IsolationForest | ˅ | 🔔 |
| Soil | 11 | IsolationForest | ˅ | 🔔 |
| Sound | 8 | Cluster | ˅ | 🔔 |
| Temperature | 2 | IsolationForest | ˅ | 🔔 |
| Vibration | 10 | Cluster | ˅ | 🔔 |
| Water | 6 | Cluster | ˅ | 🔔 |

FIG. 6

SYSTEM AND METHOD FOR ANOMALY DETECTION

STATEMENT OF ACKNOWLEDGMENT

The inventor(s) gratefully acknowledge the support provided by Imam Abdulrahman bin Faisal University, Kingdom of Saudi Arabia.

BACKGROUND

Technical Field

The present disclosure relates to a remote monitoring and anomaly detection method and system and more particularly relates to system and method to generate anomaly reports for a user selected environment using machine learning based on inputs from sensors.

Discussion of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Machine learning is a type of artificial intelligence that provides computers with the ability to learn without being explicitly programmed. Machine learning focuses on systems that can change when exposed to new data. Interest in machine learning is increasing due to a combination of advances in computing, big data management, and machine learning algorithms, among other things. Anomaly detection is a process of identifying outliers in the inputs for a region of interest (for example, offices, warehouse, shops, medicine storage plants, and the like). Example anomalies include, but are not limited to, a fire in the office, a failure in a mechanical part or a control system, high temperature in the medicine storage plants. Such anomalies may cause serious impacts including, but are not limited to, monetary losses, property damage, loss of life, etc.

Conventional systems and methods for anomaly detection suffer from one or more drawbacks hindering their adoption. Accordingly, it is one object of the present disclosure to provide a method and system to identify numerous anomalies in selected regions of interest in a smart way, verify if the reported anomalies are true and improve the detection model of the selected regions.

SUMMARY

According to an exemplary embodiment of the present disclosure, anomaly detection system is disclosed. The anomaly detection system includes a plurality of sensors, a main device, and a cloud storage. The plurality of sensors are fixed within a user-selected environment and configured to measure a plurality of environmental conditions within the user-selected environment and wirelessly transmit the plurality of environmental conditions to the main device. The main device includes a circuitry encoded with instructions from a trained machine learning model to identify a plurality of one or more anomalies in the plurality of environmental conditions. The main device is configured to transmit the plurality of one or more anomalies and the plurality of environmental conditions to the cloud storage via a plurality of wired and wireless connections. The plurality of one or more anomalies and the plurality of environmental conditions are stored at the cloud storage and the cloud storage wirelessly relays the plurality of one or more anomalies to an end user communications device that communicates the plurality of one or more anomalies to a user. The end user communications device relays a feedback signal, via the cloud storage, to the trained machine learning model, so that the feedback signal is incorporated, via the main device, into the trained machine learning model for retraining based on the feedback signal.

According to another exemplary embodiment of the present disclosure, a method of anomaly detection is disclosed. The method includes recording an environmental reading from a sensor according to a time-step; transmitting the environmental reading to a main device according to the time-step, where the main device accumulates and stores a plurality of environmental readings according to the time-step; and triggering, via a circuitry of the main device, a machine learning model when the plurality of environmental readings reaches a threshold number of readings. The method further includes identifying, via the machine learning model, an anomaly reading; categorizing, via the machine learning model, the anomaly reading into a positive anomaly reading, a negative anomaly reading, or an uncertain anomaly reading, where the anomaly reading is transmitted and stored in a cloud storage; and transmitting, via a wide area network, the positive anomaly reading from the cloud storage to an end user communications device when the anomaly reading is the positive anomaly reading. The end user communications device generates a first confirmation signal to confirm the positive anomaly reading and the machine learning model is retrained on the plurality of environmental readings coupled with the first confirmation signal. The method further includes returning the environmental reading to the main device from the cloud storage when the anomaly reading is the negative anomaly reading, where the machine learning model is retrained on the plurality of environmental readings coupled with the negative anomaly reading. The method further includes transmitting, via the wide area network, the uncertainty anomaly reading to the end user communications device, where the end user communications device generates a second confirmation signal to confirm the anomaly reading as the positive anomaly reading or as the negative anomaly reading, and the machine learning model is retrained on the plurality of environmental readings coupled with the second confirmation signal.

These and other aspects of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which:

FIG. 3 illustrates a graphical user interface (GUI) of a web application of the anomaly detection system, according to certain embodiments;

FIG. 5 is a GUI of the web application illustrating sensor settings dashboard, according to certain embodiments;

FIG. 6 is a GUI of the web application illustrating anomaly detecting settings dashboard, according to certain embodiments;

DETAILED DESCRIPTION

Figure 1:
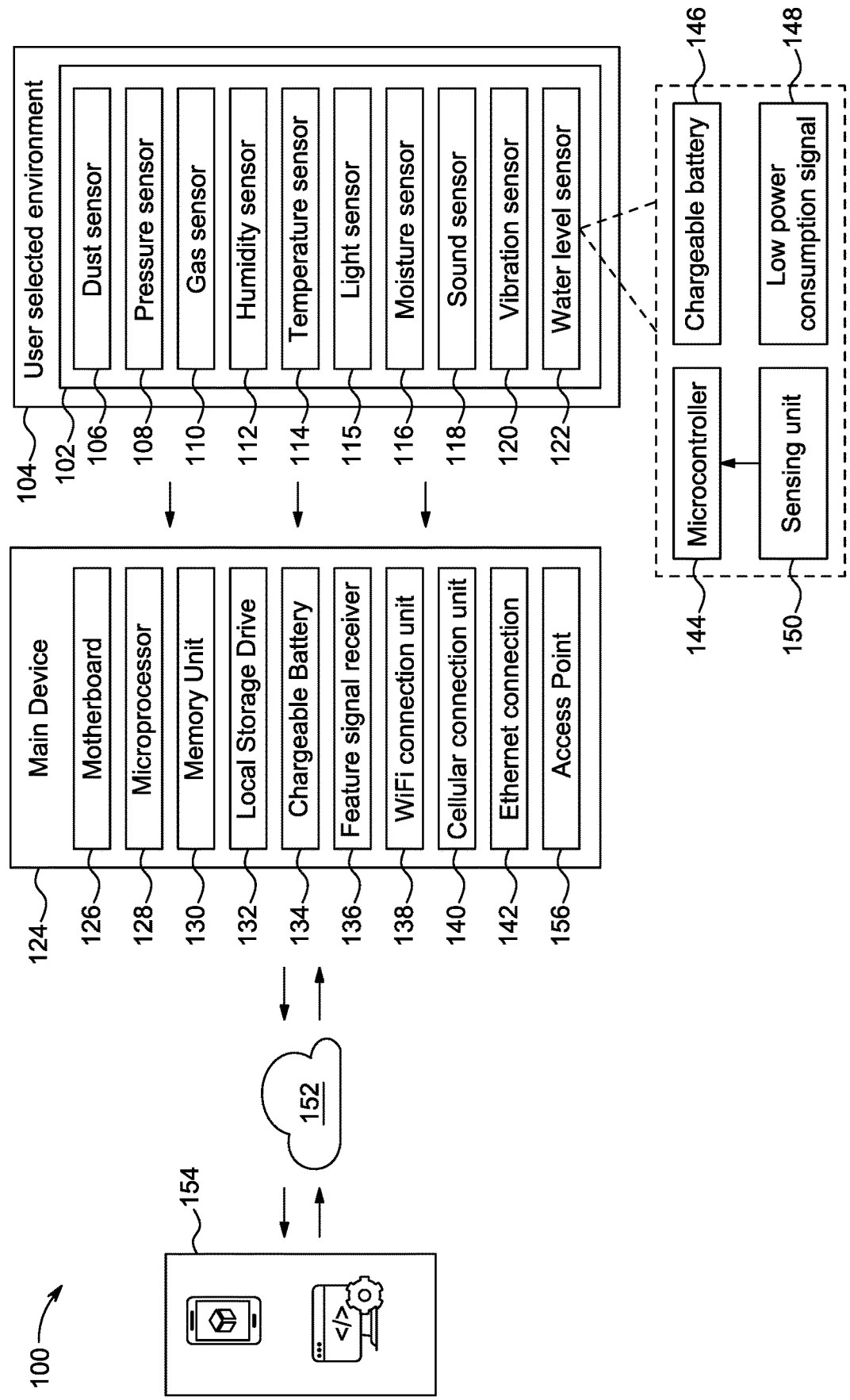
FIG. 1 illustrates an exemplary block diagram of an anomaly detection system, according to certain embodiments.

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawings. Wherever possible, corresponding, or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

In the drawings, like reference numerals designate identical or corresponding parts throughout the several views. Furthermore, the terms "approximately," "approximate," "about," and similar terms generally refer to ranges that include the identified value within a margin of 20%, 10%, or preferably 5%, and any values therebetween.

Aspects of the present disclosure are directed to enabling users to detect anomalies in a modern and smart way while maintaining user's privacy. The present disclosure provides system and method for anomaly detection, where multiple sensors are deployed in an environment that needs to be monitored. Data and readings of the surroundings from the sensors are collected and securely transmitted to a cloud computing analysis device. After sufficient recognition of the nature of the desired environment, anomalies are detected, and a trained machine learning module is improved over a time-step and through interaction with the user.

In various aspects of the disclosure, non-limiting definitions of one or more terms that will be used in the document are provided below.

The term "microcontroller" as used herein refers to a computer component adapted to control a system to achieve certain desired goals and objectives. For example, the microcontroller may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term "sensor" refers, without limitation, to the component or region of a device which is configured to detect the presence or absence of a measurable parameter. For example, a camera sensor may be a camera configured to capture images or frames.

The term 'machine learning' refers to a method of data analysis that automates analytical model building. Machine learning is a branch of AI that uses statistical techniques to allow computer systems to learn from data without being explicitly programmed.

FIG. 1 illustrates an exemplary block diagram of an anomaly detection system 100 (hereinafter referred to as "the system 100"), according to an embodiment of the present disclosure. The system 100 includes a plurality of sensors 102 fixed within a user-selected environment 104. The user-selected environment 104 may alternatively be referred to as a targeted area and includes a region of user's interest, such as, but not limited to, a warehouse, a food pantry, a patient room, or a space with indoor greenhouses. Each of the plurality of sensors 102 is configured to measure an environmental condition of the plurality of environmental conditions within the user-selected environment 104. In an embodiment, the plurality of environmental conditions may be selected from a group consisting of, but not limited to, a dust level, a pressure level, a gas level, a humidity level, a temperature level, a light level, a moisture level, a sound level, a vibration level, or a water level. Accordingly, the plurality of sensors 102 may be, but not limited to, a dust sensor 106 (for example, Sharp's GP2Y1010AU0F optical dust sensor) to sense the dust level, a pressure sensor 108 (for example, Rp-s40-st pressure sensor) to sense the pressure level, a gas sensor 110 (for example, MQ-2 gas sensor) to sense a presence of a gas and corresponding level thereof, a humidity sensor 112 (for example, DHT11 humidity sensor) to sense the humidity level, a temperature sensor 114 (for example, DHT11 temperature sensor) to sense the temperature level, a light sensor 115 (for example, LM393 Light Sensor—LDR module) to sense the light level (such as, exposure of daylight), a moisture sensor 116 to sense the moisture level, a sound sensor 118 (for example, KY-038 sound sensor) to sense the sound level, a vibration sensor 120 (for example, sw-420 vibration sensor) to sense the vibration level, and a water level sensor 122 (for example, STSx0020 water level sensor) to sense the water level. Based on a requirement, one or more of these sensors 102 may be located within the user-selected environment 104 to sense the corresponding parameters.

In a preferred embodiment of the present disclosure, a collection of particular environmental sensors are commonly located in a semi-enclosed space. In comparison to being disposed in the open without protection, certain sensors such as the dust sensor, the gas sensor, the humidity sensor, the sound sensor and the vibration sensor are preferably at least semi-isolated from the environment for purposes of providing a stable sensor output. In this respect it is preferable that the dust sensor, gas sensor, humidity, sound sensor and vibration sensor are located in a common semi-enclosed space. The semi-enclosed space is defined by an impermeable bottom that is preferably mounted on a wall or a structural member located in the region of the user's interest. The impermeable bottom is preferably made of a material that is thermally conductive but otherwise impermeable to transmission of gas. The impermeable bottom is preferably encircled along its perimeter with one or more walls defining impermeable vertically oriented walls extending from the impermeable bottom. Each of the aforementioned sensors is mounted on an extension that connects to a vertically oriented wall and extends into the semi-enclosed space parallel to the impermeable bottom. In this manner individual sensors can be better isolated from disruptive signal sources. The top of the semi-enclosed space is a partially permeable surface. Preferably, this surface is at least partially (at least 50% of the surface area) constructed of a metallic or thermally conductive material. A second minor portion (less than 50% of the surface area, preferably from 30 to 40% or 35 to 50%) is formed of a gas permeable thermoplastic membrane (e.g., having a thickness of 0.03 to 3 mm). The third portion (less than 30% of the surface area, preferably from 10 to 30% or about 20%) is formed of a mesh material having a pore size of from 1 mm to 10 mm, preferably 2-8 mm or about 5 mm.

The system 100 further includes a main device 124 that houses various components including, but are not limited to, a motherboard 126, a microprocessor 128, a memory unit 130, a local storage drive 132, a chargeable battery 134, a feature signal receiver 136, a wireless fidelity (WiFi) connection unit 138, a cellular connection unit 140, and an ethernet connection 142. The sensors 102 are configured to wirelessly transmit values corresponding the plurality of environmental conditions to the main device 124. The main device 124 includes a circuitry encoded with instructions from a trained machine learning model to identify a plurality of one or more anomalies in the plurality of environmental conditions. In one embodiment, the main device 124 may be located within the user-selected environment 104. In another embodiment, a location of the main device 124 may be outside the user-selected environment 104. As used herein, the term "user-selected environment" may be defined by a distribution and a sensory range of the plurality of sensors 102, where the sensory range is restricted by the main device 124 to a boundary of the user-selected environment 104.

Each sensor 102 includes a microcontroller 144, a chargeable battery 146, a low power consumption signal 148, and a sensing unit 150. In some embodiments, the sensing unit 150 may include a pressure measuring device. The sensing unit 150 is electronically connected to the microcontroller 144 and configured to measure each environmental condition of the plurality of environmental conditions. The sensing unit 150 and the microcontroller 144 are together configured to wirelessly output each of the plurality of environmental conditions to the main device 124 according to a time-step update. As such, the plurality of sensors 102 are configured to transmit to the main device 124, signals corresponding to the plurality of environmental conditions.

At the main device 124, the feature signal receiver 136 receives the signals corresponding to the plurality of environmental conditions from the plurality of sensors 102 and values corresponding to each of the plurality of environmental conditions are stored in the local storage drive 132. In an example, the local storage drive 132 may be embodied as a hard drive or a solid-state drive (SSD) that is installed within the main device 124. A storage capacity of such local storage drive 132 may be determined based on type of inputs, for example digital inputs, received from the sensors 102. The trained machine learning model in the main device 124 identifies an anomaly corresponding to the environmental conditions. In some embodiments, the plurality of sensors 102 and the main device 124 may be connected via a local communication network (not shown).

In one aspect, new sensor(s) may be included in the user-selected environment 104, where the new sensor(s) includes the components described hereinabove with respect to the sensors 102. For example, a soil sensor (for example, LM393 soil moisture sensor) may be added to the set of sensors 102 in the user-selected environment 104. The main device 124 may include an access point 156 configured to detect a broadcasting signal output by the new sensor(s). Upon detection of the broadcasting signal, the access point 156 may scan and authenticate the new sensor(s). Upon completion of the authentication, the main device 124 may be configured to integrate the new sensor(s) into the plurality of sensors 102.

The system 100 also includes a cloud storage 152 and the main device 124 being configured to transmit the plurality of one or more anomalies and the plurality of environmental conditions to the cloud storage 152 via a plurality of wired and wireless connections. Although not illustrated in figures, in an embodiment, the cloud storage 152 may include a cloud service unit, a machine learning unit, a cloud data storage unit, and a processing unit.

The motherboard 126, the microprocessor 128, and the memory unit 130 of the main device 124 are configured to process and transfer the plurality of environmental conditions and the plurality of one or more anomalies from the local storage drive 132 to the cloud storage 152. In an embodiment, the WiFi connection unit 138, the cellular connection unit 140, and the ethernet connection 142 aids the connection between the main device 124 and the cloud storage 152. In some embodiments, the low power consumption signal 148 of each sensor 102 may include a wireless transmitter (not shown) configured to transmit a low power signal to the cloud storage 152. In another embodiment, the low power consumption signal 148 may comprise a light diode (not shown) emitting a light signal in the visible light spectrum.

Data corresponding to the plurality of one or more anomalies and the plurality of environmental conditions are stored at the cloud storage 152. Further, the cloud storage 152 is configured to wirelessly relay the data corresponding to the plurality of one or more anomalies to an end user communications device 154. In an example, the end user communications device 154 may be embodied as a handheld device (such as a smartphone) with a mobile application, or as a computer with a web application, configured to receive and process the data received from the cloud storage 152. In an embodiment, the data corresponding to the plurality of one or more anomalies and the plurality of environmental conditions may be displayed in a form of a graphical dashboard in the end user communications device 154. As such, the end user communications device 154 is configured to communicate data corresponding the plurality of one or more anomalies, to the user. In an embodiment, the main device 124 and cloud storage 152 may be connected to the end user communications device 154 via a wide area network. Based on the received data, the end user communications device 154 is configured to relay a feedback signal, via the cloud storage 152, to the trained machine learning model of the main device 124. Feedback communicated from the end user communications device 154 is incorporated into the trained machine learning model for the purpose of retraining the trained machine learning model. With multiple such feedback signals from the end user communications device 154, the trained machine learning model may be capable of ascertaining authenticity of each of the plurality anomalies.

In some embodiments, a network unit (not shown) may be implemented as an interface to communicatively couple the components of the system 100 through various means including, but not limited to, standard telephone lines, Local Area network (LAN) or a Wide Area Network (WAN) links, broadband connections, wireless connections, or combination of any or all of the above. The network unit may use various communication protocols such as a TCP/IP, Ethernet, IEEE 802.11, WiFi, WiMAX, and such protocols. The network unit may include network interface card, a wireless network adapter, USB network adapter, modem, or any other elements enabling coupling the components of the system 100 with any type of network capable of communication and performing the operations described herein.

Figure 2:
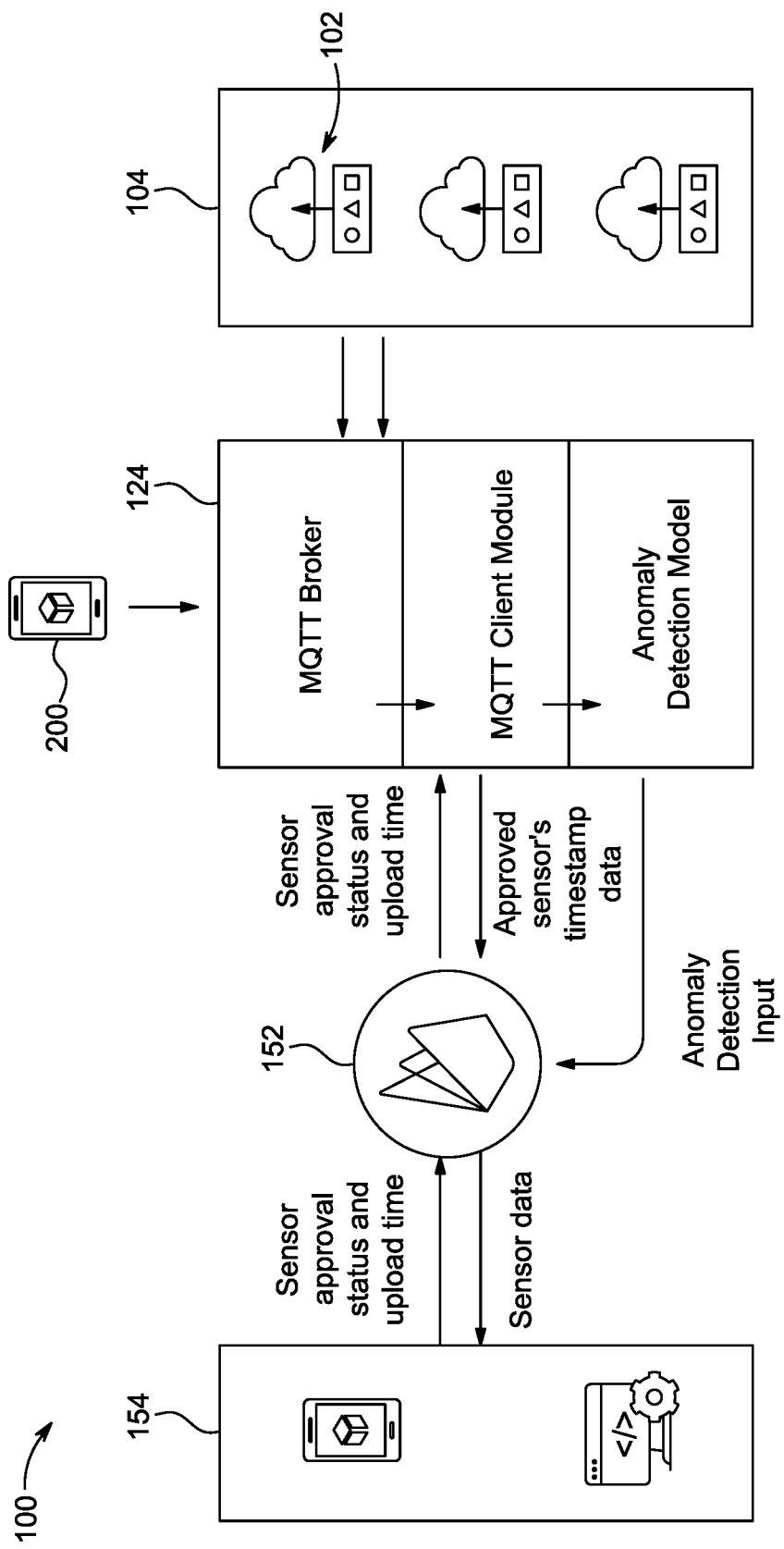
FIG. 2 illustrates a technical layout of the anomaly detection system, according to certain embodiments.

FIG. 2 illustrates a technical layout of the system 100, according to an aspect of the present disclosure. FIG. 2 is described in conjunction with FIG. 1. The microcontroller 144 (for example, a firebeetle Esp32 microcontroller) may be programmed with C++ using, for example, Arduino Integrated Development Environment (commonly referred to as Arduino IDE) to store data in form of global and local variables. As described in FIG. 1, the sensing unit 150 is connected to the microcontroller 144 and "the sensing unit 150+the microcontroller 144" pair functions as a Message Queuing Telemetry Transport (MQTT) client. The microcontroller 144 provides the WiFi connection to the sensing unit 150 and, owing to such connection, the microcontroller 144 measures readings of the parameter sensed by the sensing unit 150 of corresponding sensor 102. The MQTT client is configured to publish the data (such as the measured value of the parameter sensed by the sensing unit 150) to a MQTT broker (such as the main device 124) relating to a parameter based on a type of the sensor 102 and corresponding identification of the sensor 102. For example, the published data may be humidity [1], where the term humidity is the parameter sensed by the humidity sensor 112 and "1" indicates the identification number of the humidity sensor 112. Along with such data, the values of humidity measured by the microcontroller 144 is also published. As described earlier, each sensor 102 includes a microcontroller (such as the microcontroller 144) configured to measure the corresponding parameter sensed by that sensor 102. As such, each microcontroller is configured to publish the respective data to the main device 124.

In an embodiment, a default publishing time period may be every 5 minutes. However, in some embodiments, the user may be allowed to change a publishing time period to any positive time value using the end user communications device 154. In some embodiments, each microcontroller may be configured to learn about the publishing time period from the main device 124. For example, the microcontroller (such as the microcontroller 144) may be configured to execute the below:

Fetch publishing time:
   IF Exist: set next upload time;
   ELSE: Use default upload time When a new sensor is added to the user-selected environment 104, the microcontroller of the new sensor transmits a MQTT packet to the MQTT broker (alternatively referred to as "the main device 124" in the present disclosure) to announce presence of the new sensor included in the user-selected environment 104. In some embodiments, information regarding the addition of the new sensor to the user-selected environment 104 may be provided as an input by an auxiliary device 200 (for example, an android phone) to the MQTT broker. In case of such addition of the new sensor, an access to the MQTT broker may be secured with user identification and password. For authentication purposes, in some embodiments, the auxiliary device 200 may be paired with the main device 124 using, for example, service set identifier (SSID), user id, and password. Upon successful authentication, the auxiliary device 200 may announce the addition of the new sensor to the user-selected environment 104.

In an embodiment, a Raspberry pi device may be implemented as the main device 124 and may be programmed using, for example, Python scripting language and Bash scripting language. The Raspberry pi device may be configured to manage and control all the sensors 102 and perform anomaly detection. For such purpose, the Raspberry pi device may include three segments, namely the MQTT broker (that is configured to receive all messages from the clients, such as the sensors 102 and the auxiliary device 200), the MQTT client module, and an anomaly detection model. The Raspberry pi device may be configured to run the MQTT broker to gather all messages (such as data) from the clients. Data received from each of the sensors 102 may be stored on a local server, for example MariaDB. In operation, the Raspberry pi device may be configured to actuate the access point 156, where the microcontrollers of all the sensors 102 may connect with a static IP address. Information relating to the sensors 102 pre-installed in the user-selected environment 104 may be stored in the Raspberry pi device. As such, when the microcontrollers of such existing sensors 102 connect with the access point 156, the Raspberry pi device may consider the data from such sensors 102 as, for example, known data. In such cases, the presence of the new sensor may be easily identified, and the Raspberry pi device may be configured to automatically initiate required procedure to add the new sensor to a list of sensors 102 and may allow the corresponding microcontroller of the new sensor to transmit data to the Raspberry pi device.

Further, using, for example, Paho MQTT Python client library, the Raspberry pi device may be configured to run the MQTT client module to subscribe to all parameters received from the sensors 102. When the new sensor connects for the first time, the Raspberry pi device may be configured to upload its identification and type (such as, "humidity [1]" as described earlier) to a cloud database (such as the cloud storage 152) and may set the anomaly detection model of the new sensor to clustering by default. In some embodiments, the Raspberry pi device may be configured to announce, to the user, addition of the new sensor by setting its status to "New" in the sensors' settings dashboard in the end user communications device 154. When the user accepts the addition of the new sensor, the Raspberry pi device may be configured to periodically transmit to the cloud storage 152, the data received from the new sensor. In cases where the user wishes to stop receiving data from a specific sensor 102 for a predefined time period, the user may be allowed to set a status of such sensor 102 to "Rejected" and such selection may trigger a signal to the Raspberry pi device via the cloud storage 152. Upon receipt of such signal from the end user communications device 154, the Raspberry pi device may be configured to discard any MQTT packet (such as, data from the sensor 102) from such sensor until the status is set to "Accepted" by the user.

In cases where the addition of the new sensor was not initiated by the user, or if the user fails to identify the new added sensor, the end user communications device 154 may allow the user to set the status of the new sensor to "Deleted" and the Raspberry pi device may be configured to discard all the incoming MQTT packet from the new sensor. Although the term "discard", as used herein, refers to "reject as no longer useful", in some embodiments, the data from such new sensors may be stored in a memory (not shown) of the Raspberry pi device and may be provided to the user as historical data when the status of the new sensor is set to "Accepted". When the data corresponding to the accepted sensors 102 reach a predefined threshold, for example 1000 readings, the Raspberry pi device may be configured to run the anomaly detection model (set to a clustering model by default) on every new reading and trigger an alarm to the cloud storage 152 regarding the reading associated with anomaly and corresponding timestamp of the anomaly. In an aspect, the cloud storage 152 (for example, cloud real-time cloud server) may be configured to store all the data received by the Raspberry pi device, in form of JSON tree (otherwise described as "iTree"); store anomaly cases; store information corresponding to user accounts and preferences; connect the main device 124 with the end user communications device 154; and process data and operations.

As described earlier, the end user communications device 154 may be embodied as a handheld device (such as a smartphone) with a mobile application, or as a computer with a web application, configured to receive and process the data received from the cloud storage 152. In one aspect, the mobile application may be an android mobile application programmed using Java and configured to store data locally—using for example SQLite database. In another aspect, the web application may be programmed using one or more of HTML, JavaScript, NodeJs and configured to read and write data from the cloud storage 152.

The user may be allowed to create a user account in the access point 156 either using the web application or the mobile application. When the system 100 is operated for the first time, the Raspberry pi device would require access to the internet and the user account to upload all the data relating to the sensors 102. The user may, via the end user communications device 154, connect to the access point 156 and share the details of the user account along with network credentials using "Set up new device" interface in the end user communications device 154 (for example, the mobile application). Such connection with the access point 156 may be protected by MQTT username and password which may be hardcoded in mobile application.

As used here, the "mobile application" refers to a custom-made application for the mobile device that provides access to the access point 156 via authentication of credentials. Post authentication, the user may be allowed to access and manage the data relating to the sensors 102 from anywhere, without the need to be connected to the network. In an embodiment, the data (including detected anomaly) relating to the sensors 102 may be provided in form of dashboard (such as graphical dashboard) in the mobile application.

When the new sensors is added to the list of sensors 102, the details of the new sensor may be provided to the user in the mobile application and the user may be allowed to manage the status of the new sensor (such as Accept, Reject, Delete), set the anomaly detection model (for example, clustering, Support Vector Machine (SVM), Isolation Forest), and choose a representation name for the new sensor to be used thereafter. In some embodiments, more than one user-selected environment may be available for access by the user in the mobile application. When one or more sensors 102 need to be relocated from one user-selected environment (such as the user-selected environment 104) to another user-selected environment, the user may be allowed to reset the user-selected environment based on the relocation. The user may also be allowed to delete all the data stored relating to the sensor 102 being relocated, so that old data is not considered for anomaly detection.

The anomaly detection model is described below:

Clustering Model or K-Means Clustering:

Given a set of observations ($x_1, x_2, \ldots, x_n$), where each observation is a d-dimensional real vector, k-means clustering aims to partition the n observations into k (<n) sets, $S=\{S_1, S_2, \ldots, S_k\}$, so as to minimize the within-cluster sum of squares (WCSS). The objective is to find:

$$\arg m \sum_{S}{}_{i=1}^{k} \sum_{x \in S_i} \|x - \mu_i\|^2 = \arg m \sum_{S}{}_{i=1}^{k} |S_i| \text{Var } S_i \quad [1]$$

where $\mu_i$ is the mean of points in St. This is equivalent to minimizing the pairwise squared deviations of points in the same cluster:

$$\arg m \sum_{S}{}_{i=1}^{k} \frac{1}{2|S_i|} \sum_{x,y \in S_i} \|x - y\|^2 \quad [2]$$

The equivalence can be deduced from identity:

$$\Sigma_{x \in S_i} \|x - \mu_i\|^2 = \Sigma_{x \neq y \in S_i} (x - \mu_i)^T (\mu_i - y) \quad [3]$$

Since the total variance is constant, the sum of squared deviations between points in different clusters (between-cluster sum of squares, BCSS) are maximized, which follows from the law of total variance.

Anomaly detection with Isolation Forest is a process composed of two main stages:

Stage-1: a training dataset is used to build iTrees as described in previous sections; and Stage-2: each instance in the test set is passed through the iTrees built in the previous stage, and an "anomaly score" is assigned to the instance as described below.

Once all the instances in the test set have been assigned an anomaly score, the anomaly may be determined. For example, a data point where the anomaly score is greater than a predefined threshold may be marked as "anomaly", based on a domain in which the analysis is being applied.

Computing the anomaly score of the data point is based on the observation that the structure of iTrees is equivalent to that of Binary Search Trees (BST), where a termination to an external node of the iTree corresponds to an unsuccessful search in the BST. As a consequence, an average may be estimated as:

$$c(m) = \begin{cases} 2H(m-1) - \frac{2(m-1)}{n} & \text{for } m > 2 \\ 1 & \text{for } m = 2 \\ 0 & \text{otherwise} \end{cases} \quad [4]$$

where n is a testing data size, m is the size of a sample set, and H is the harmonic number, which may be estimated as:

$$H(i) = \ln(i) + \gamma \quad [5]$$

where $\gamma = 0.5772156649$ is the Euler-Mascheroni constant.

A value of c(m) represents an average of h(x) given m. As such, value of h(x) may be normalized, and the anomaly score may be estimated for a given instance x:

$$s(x, m) = 2^{\frac{-E(h(x))}{c(m)}} \quad [6]$$

where E(h(x)) is the average value of h(x) from a collection of iTrees. For any given instance x:

If s is close to 1, then x is very likely to be an anomaly;

If s is smaller than 0.5, then x is likely to be a normal value; and

If for a given sample all instances are assigned an anomaly score of around 0.5, then it is safe to assume that the sample doesn't have any anomaly.

One-Class Support Vector Machines (SVM):

One-class SVM is a variation of the SVM that can be used in an unsupervised setting for anomaly detection. Unlike a regular supervised SVM, the one-class SVM does not have target labels for model training process. Instead, the one-class SVM learns a boundary for normal data points and identifies the data points outside the boundary as anomalies.

In an aspect, SVM based one-class classification (OCC) relies on identifying a smallest hypersphere (with a radius r, and a center c) consisting of all the data points. This method is referred to as Support Vector Data Description (SVDD) and may be defined in the following constrained optimization form:

$$\min_{r,c} r^2 \text{ subject to, } \|\Phi(x_i) - c\|^2 \leq r^2 \forall i = 1, 2, \ldots, n. \quad [7]$$

However, the above formulation may be highly restrictive, and is sensitive to the presence of anomalies. Therefore, a flexible formulation, that allows for presence of anomalies is formulated as shown below:

$$\min_{r,c,\zeta} r^2 + \frac{1}{\nu n} \sum_{i=1}^{n} \zeta_i, \quad [8]$$

subject to, $\|\Phi(x_i) - c\|^2 < r^2 + \zeta_i \forall i = 1, 2, \ldots, n$

From Karush-Kuhn-Tucker (KKT) optimality conditions:

$$c = \Sigma_{i=1}^{n} \alpha_i \Phi(x_i) \quad [9]$$

where $\alpha_i$ the solution to the following optimization problem:

$$\max_{\alpha} \sum_{i=1}^{n} \alpha_i \kappa(x_i, x_i) - \sum_{i,j=1}^{n} \alpha_i \alpha_j \kappa(x_i, x_j) \quad [10]$$

subject to, $\Sigma_{i=1}^{n} \alpha_i = 1$ and $$0 \leq \alpha_i \leq \frac{1}{\nu n}$$

for all $i = 1, 2, \ldots, n$.

Both the one-class SVM and the isolation forest algorithms are capable of properly modeling multi-modal data sets. One-class SVM is sensitive to anomalies, making it more appropriate for novelty detection, when the training data is not contaminated with anomalies. Since the splits of the decision tree are chosen at random, the isolation forest is faster to train. In general, the SVMs are slow to train, especially with respect to the training set size. The K-Means Clustering algorithm requires the number of clusters (k) to be specified in advance, and may not handle noisy data and outliers, and hence may not be suitable to identify clusters with non-convex shapes.

Following are pseudocodes which may be implemented in the system 100 according to one embodiment:

For Microcontroller 144 and the Sensing Unit 150:
```
BEGIN
  Set topic name←Sensor's name
  While True:
    Connect to the System Network
    If Connected:
      Set MQTT username=user
      Set MQTT password=pwd
      Connect to the System MQTT Broker
      Read Sensor data
      Publish MQTT to topic
      Fetch Sleep Time from database
      If sleep time set by user:
        Sleep for user's required time
      Else:
        Sleep for 5 minutes
```

For the Main Device 124 (Raspberry Pi):
(a) Connection:
```
Begin
Connect to WIFI
Set Access point name←name
Set Access point password←pwd
Start Access point
Start MQTT Broker
Connect to cloud Realtime database
While True:
  Subscribe to MQTT sensor's topics
  Subscribe to MQTT Android mobile phone topic
  //used to handle sensors' data
  IF new reading arrives from microcontrollers:
    Fetch sensors state and anomaly_detection_model
      from cloud database
    IF sensor is approved by the user:
      Upload sensor's data
      Call Anomaly_detection (sensor's data, sensor's type, sensor's, nomaly_detection_model, timestamp)
    Else IF sensor is rejected by the user:
      Discard sensor's data
    Else IF sensor is connected to the first time:
      Upload sensor's type, id to the database and set
      its' status to NEW
    End IF
  //used to update cloud user or network data
  Else IF new reading arrives from Android mobile phone:
    Set cloud username←received username
    Set network SSID←received SSID
    Set network password←received password
    Connect to new network
  End IF
End
```

(b) Anomaly Detection Model:
```
Procedure Anomaly_detection (sensor's data, sensor's
  type, sensor's, anomaly_detection_model,timestamp):
Read sensor's data file located internally
IF file exists:
  Add sensor's data to the file
  Fetch number of available readings
  IF available readings>250
    Start anomaly detection model
  End IF
//file does not exist (first reading of the sensor)
Else:
  Create new File with the sensor's name and id
  Add sensor's data to the file
End IF
```

For End User Communications Device 154:
(a) Launch:
```
Begin
Get network Access permission
Start Main interface
Main interface:
  IF signUp selected:
    Start signUp interface
  Else IF LogIn selected:
    Start LogIn interface
  Else IF Register new Device selected:
    Start Register new Device interface
End
```

(b) Sign-Up Interface:
```
Create cloud instance:
  Enter First name
  Enter Last name
  Enter Email
  Enter Password
  Repeat Password
  Check All fields are filled:
  IF all field filled properly:
    check if email already exist in cloud
    IF email already exist:
      ask user to log in or use different email
    Else:
      create new account in cloud
    End IF
  Else:
    promote user to re-enter missing data
  End IF
End
```

(c) Login Interface:
```
Enter Email
Enter Password
Connect to cloud
IF Credentials correct:
  Start Dashboard interface
Else:
  Ask user to check entered data
End IF
End
```

(d) Register New Device Interface:
```
Select user id
Enter Network SSID
Enter Network Password
Promote user to Connect to the System network
Connect to MQTT broker
IF connections success:
  Publish MQTT to Android topic
  Start Main interface
End
```

(e) Dashboard Interface:
```
Connect to cloud database:
Select desired sensor
Select number of readings
Fetch sensor's data
Display Realtime graph
End
```

Figure 4A:
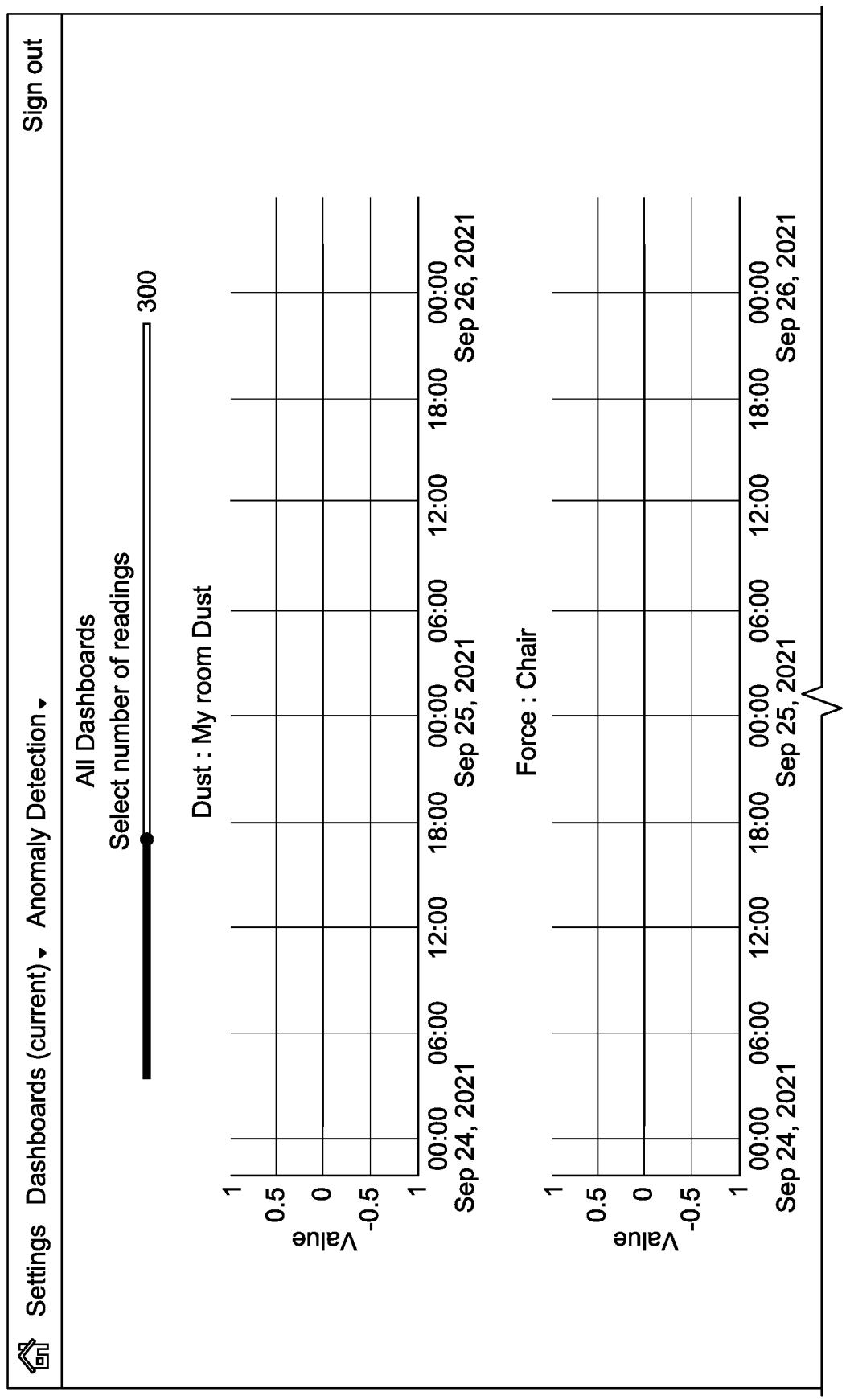
FIG. 4A is a GUI of the web application illustrating graph plots of readings from a dust sensor and a force/pressure sensor, according to certain embodiments.
Figure 4B:
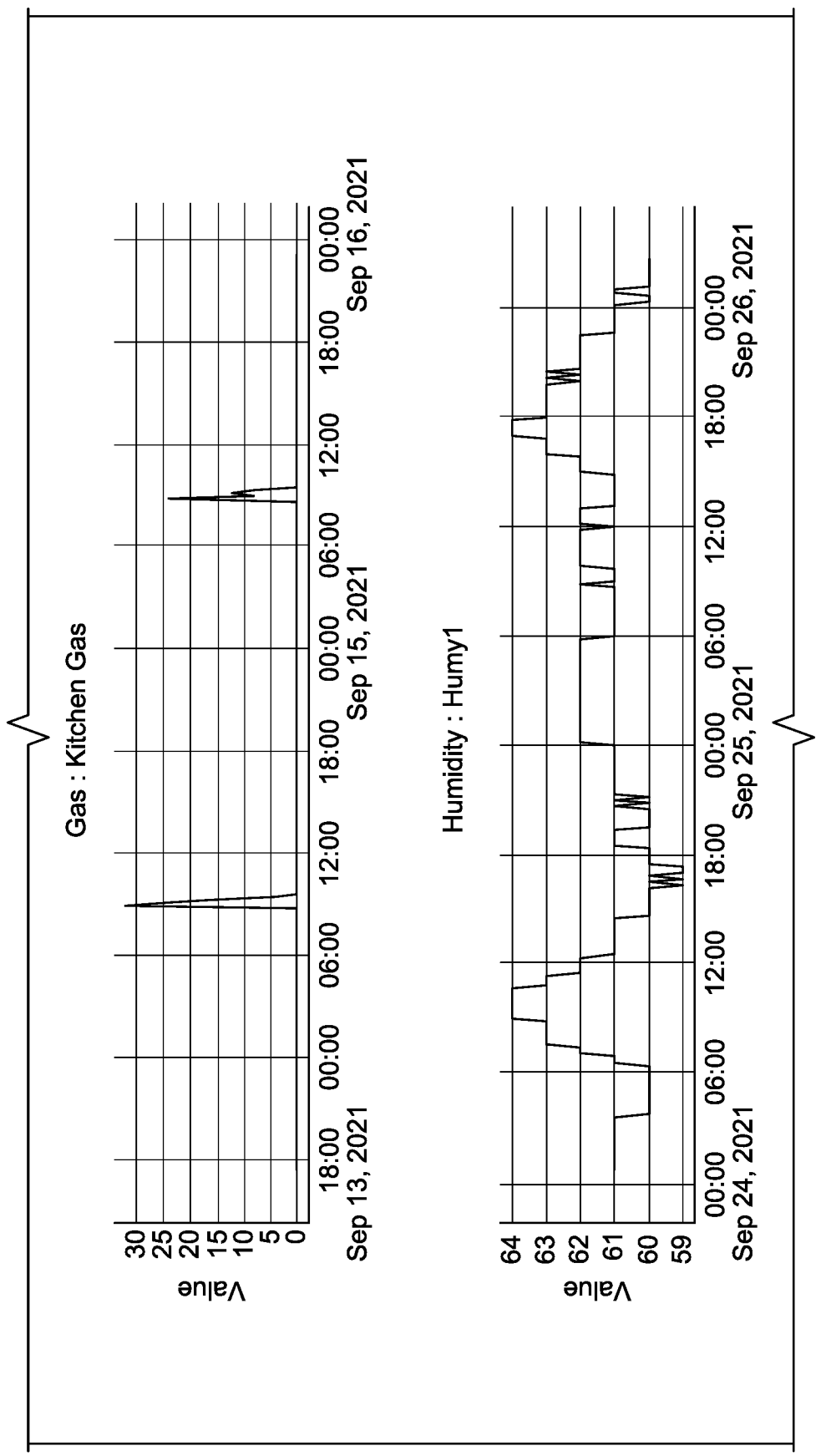
FIG. 4B is a GUI of the web application illustrating graph plots of readings from a gas sensor and a humidity sensor, according to certain embodiments.
Figure 4C:
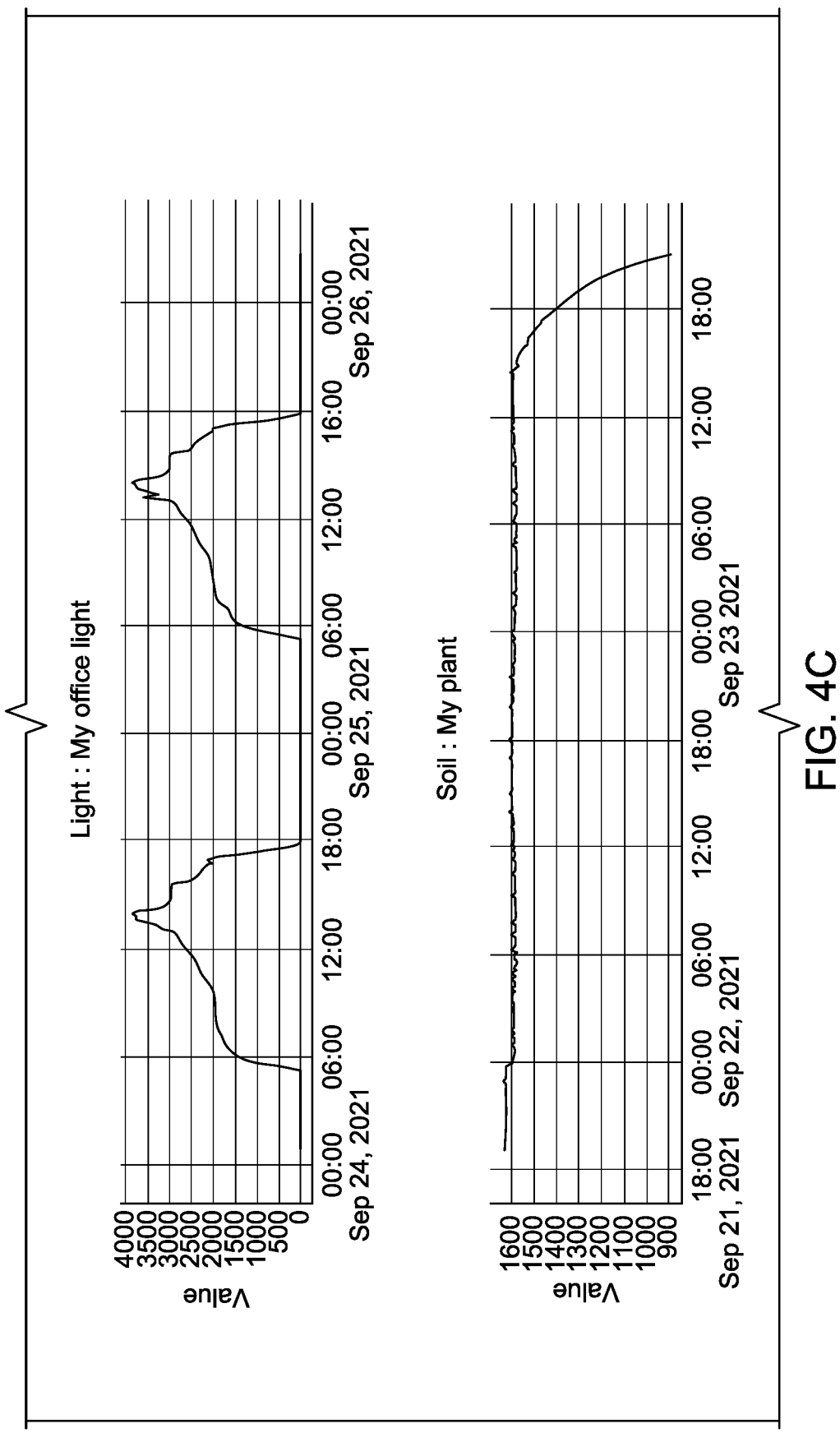
FIG. 4C is a GUI of the web application illustrating graph plots of readings from a light sensor and a soil sensor, according to certain embodiments.
Figure 4D:
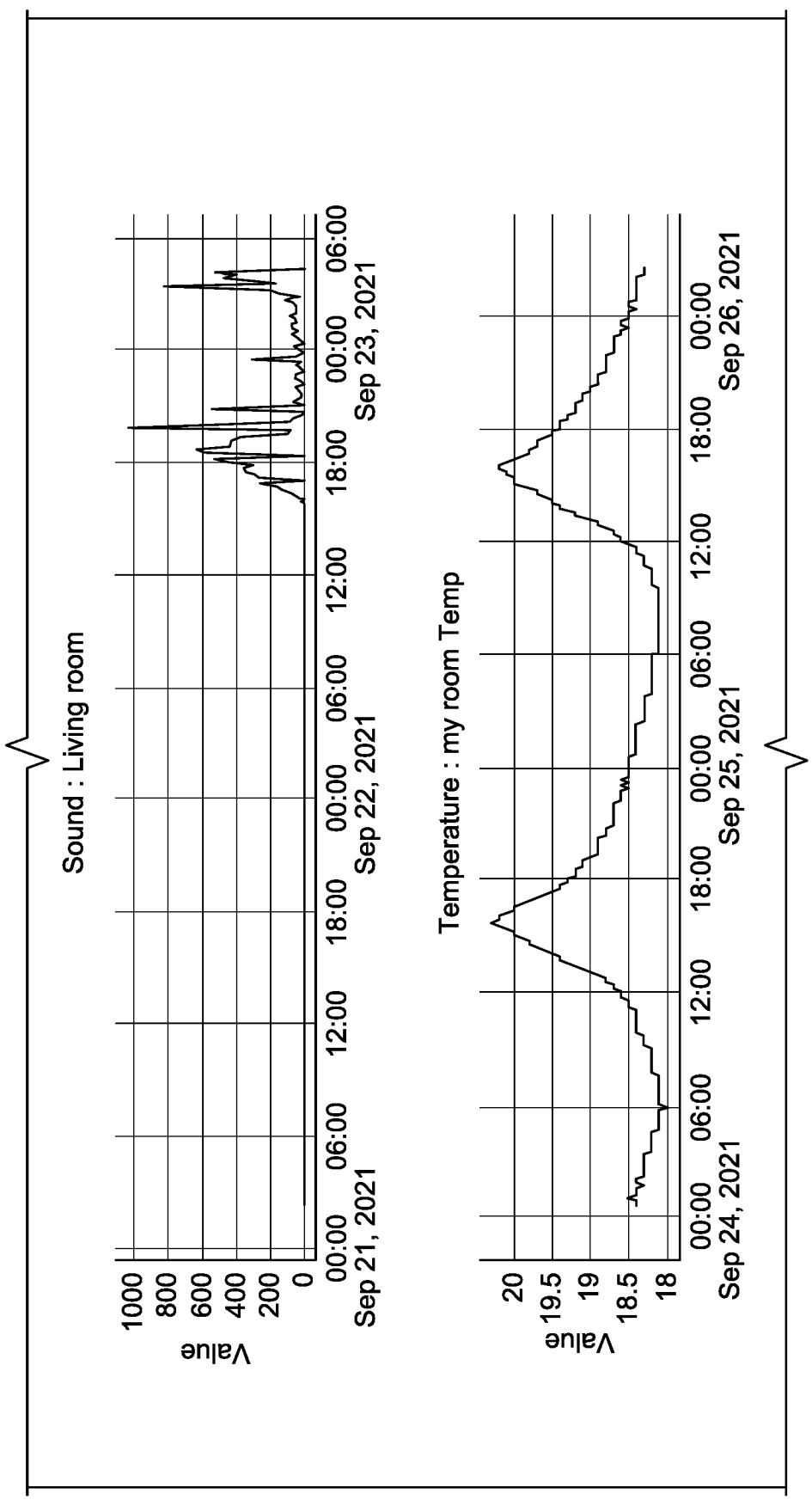
FIG. 4D is a GUI of the web application illustrating graph plots of readings from a sound sensor and a temperature sensor, according to certain embodiments.
Figure 4E:
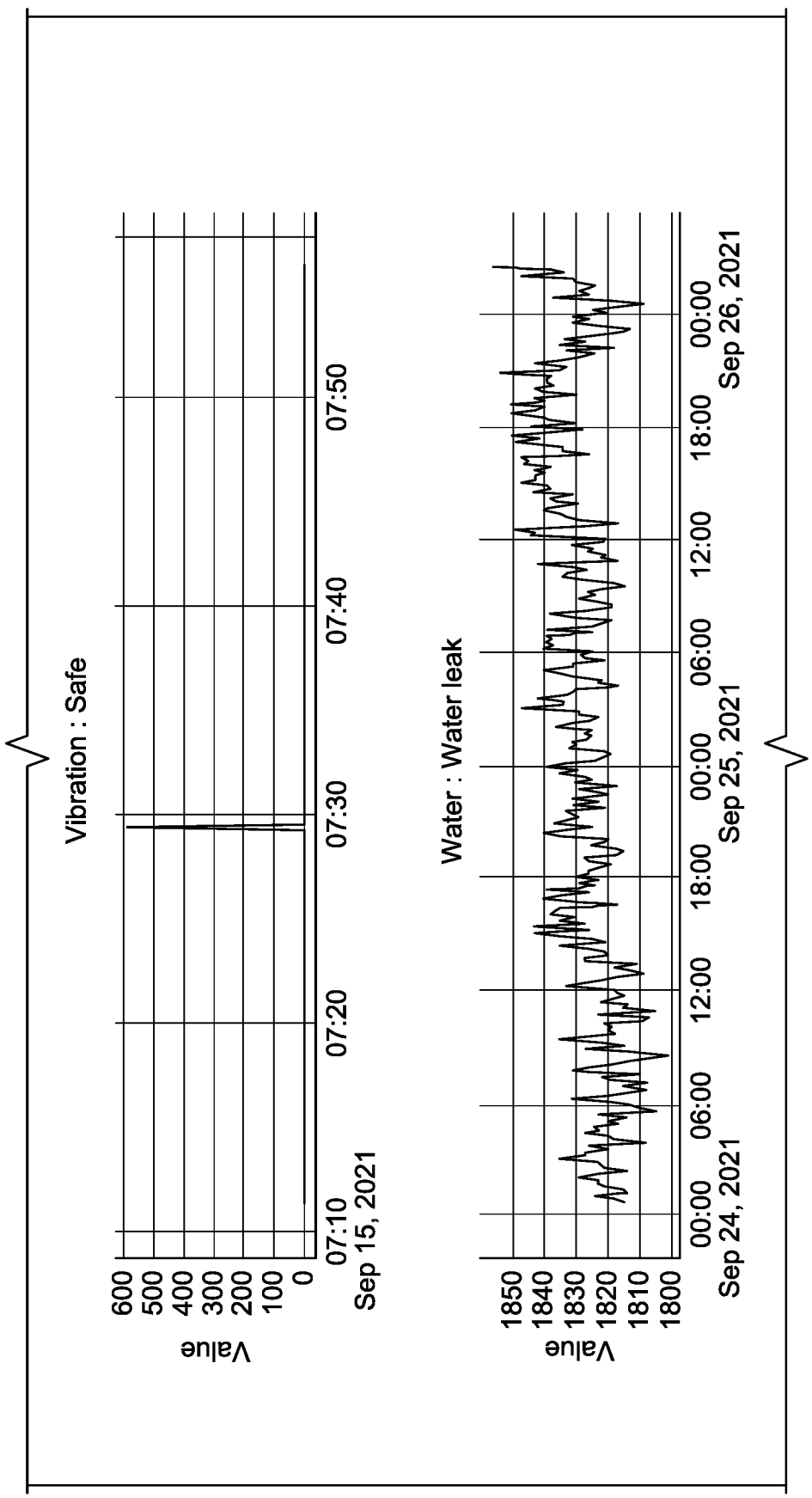
FIG. 4E is a GUI of the web application illustrating graph plots of readings from a vibration sensor and a water sensor, according to certain embodiments.

(f) Anomalies Interface:
   Connect to cloud database:
   Select desired sensor
   Select number of readings
   Fetch sensor's data anomalies
   Display Realtime graph
   End FIG. 3 illustrates exemplary images of a sign-up webpage and a sign-in webpage of the web application of the end user communications device 154. Following are pseudocodes which may be implemented for the web application:

(a) Launch:
   Begin
   Start Main interface
   Main interface:
   IF signUp selected:
   Start signUp page
   Else IF LogIn selected:
   Start LogIn page
   End IF
   End (b) Sign-Up Page:
   Create cloud instance:
   Enter First name
   Enter Last name
   Enter Email
   Enter Password
   Repeat Password
   Check All fields are filled:
   IF all field filled properly:
      check if email already exist in cloud
      IF email already exist:
         ask user to log in or use different email
      Else:
      create new account in cloud
      End IF
   Else:
      promote user to re-enter missing data
   End IF
   End (c) Login Page:
   Enter Email
   Enter Password
   Connect to cloud
   IF Credentials correct:
      Start Dashboard interface
   Else:
      Ask user to check entered data
   End IF
   End (d) Dashboard Page:
   Connect to cloud database:
   Select desired sensor or all sensors
   Select number of readings
   Fetch sensors' data
   Display Realtime graphs
   End (e) Anomalies Page:
   Connect to cloud database:
   Select desired sensor or all sensors
   Select number of readings
   Fetch sensors' data anomalies
   Display Realtime graphs
   End (f) Settings Page:
   Connect to cloud database:
   Display all connected sensors to the system for each sensor:
      Enable users to set (sensors name, state, anomaly detection model, update time)
   End FIG. 4A through FIG. 4E illustrates portions of the dashboard of the web application depicting graph plots of measured values of parameters corresponding to the sensors 102. For example, FIG. 4A illustrates graph plots corresponding to the readings of the dust sensor 106 located in user's room. The readings are identified with user set name for the dust sensor 106, such as "Dust: My room dust" according to one example. Similarly, the pressure sensor 108 located in a chair in the user room's is identified with user set name as "Force: Chair" according to another example. The other graphs plots of FIG. 4B through FIG. 4E illustrates the names set by the user for respective sensors for the purpose of identification.

FIG. 5 illustrates an exemplary settings interface where the user is allowed to control all the sensors 102 and FIG. 6 illustrates an extension of the settings interface where the user is allowed to manage the anomaly detection model for each sensor 102.

Figure 7:
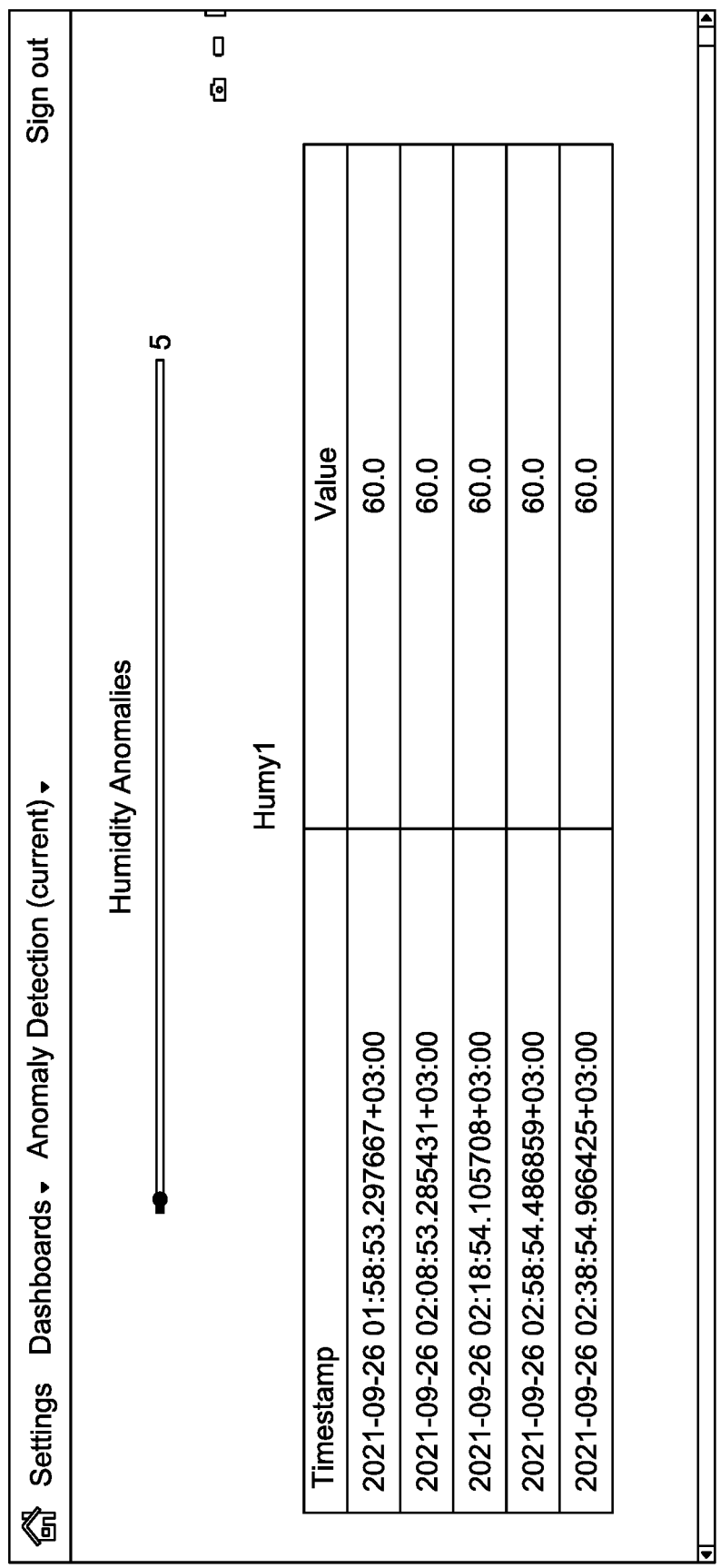
FIG. 7 is a GUI of the web application illustrating readings from the sensors, according to certain embodiments.

FIG. 7 illustrates an exemplary anomalies interface that indicates the presence of anomaly from the sensors 102. The image in FIG. 7 shows the readings and timestamp of each reading received by the main device 124 from the humidity sensor 112. The user may be allowed to select the desired sensor to view the readings corresponding to that sensor 102. The value of each reading is also indicated on the dashboard. As described earlier, when the data point lies beyond the boundary or when the value of the reading is above a threshold value, the reading is considered as an anomaly and reposted to the user via the dashboard. In an embodiment, color coding or text of differing sizes may be followed to emphasis the value of the readings which are above the threshold value.

Figure 8:
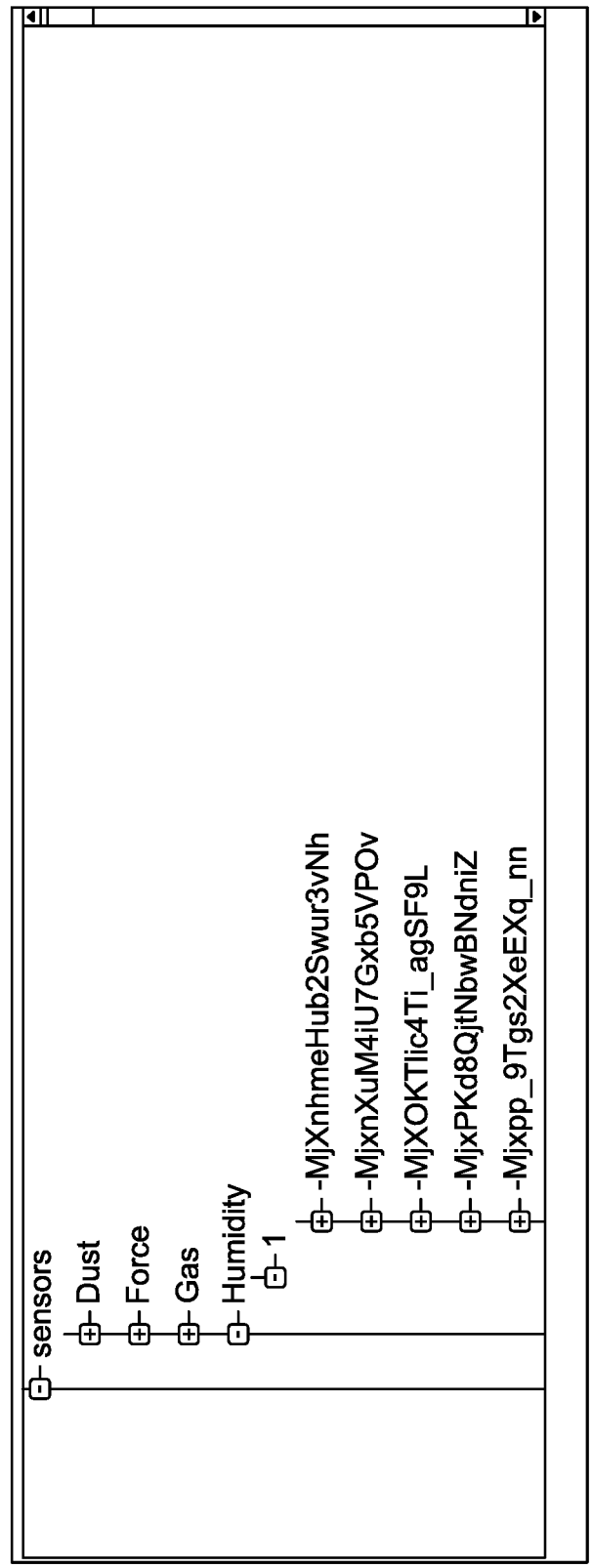
FIG. 8 is a screenshot of a GUI of a cloud real-time database, according to certain embodiments.

FIG. 8 illustrates a screenshot of cloud real-time database. Historical data of each sensor 102 may be stored in the database (for example, MariaDB). The user may be allowed to access any of the historical data of each sensor 102 as desired.

Figure 9:
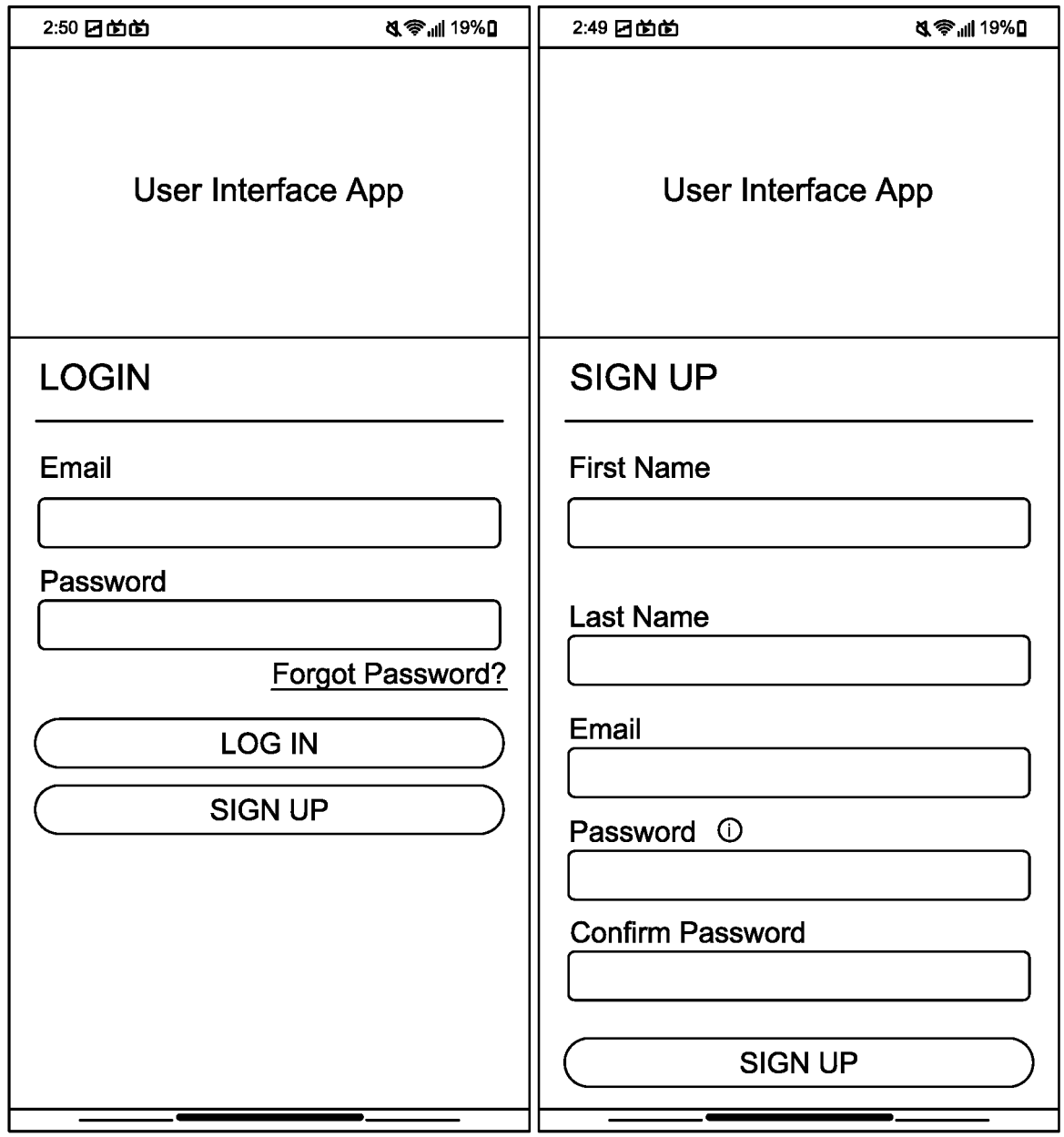
FIG. 9 is a GUI of a mobile application illustrating login page for accessing the readings from the sensors, according to certain embodiments.
Figure 10:
FIG. 10 is a GUI of the mobile application illustrating sensor settings dashboard, according to certain embodiments.
Figure 11:
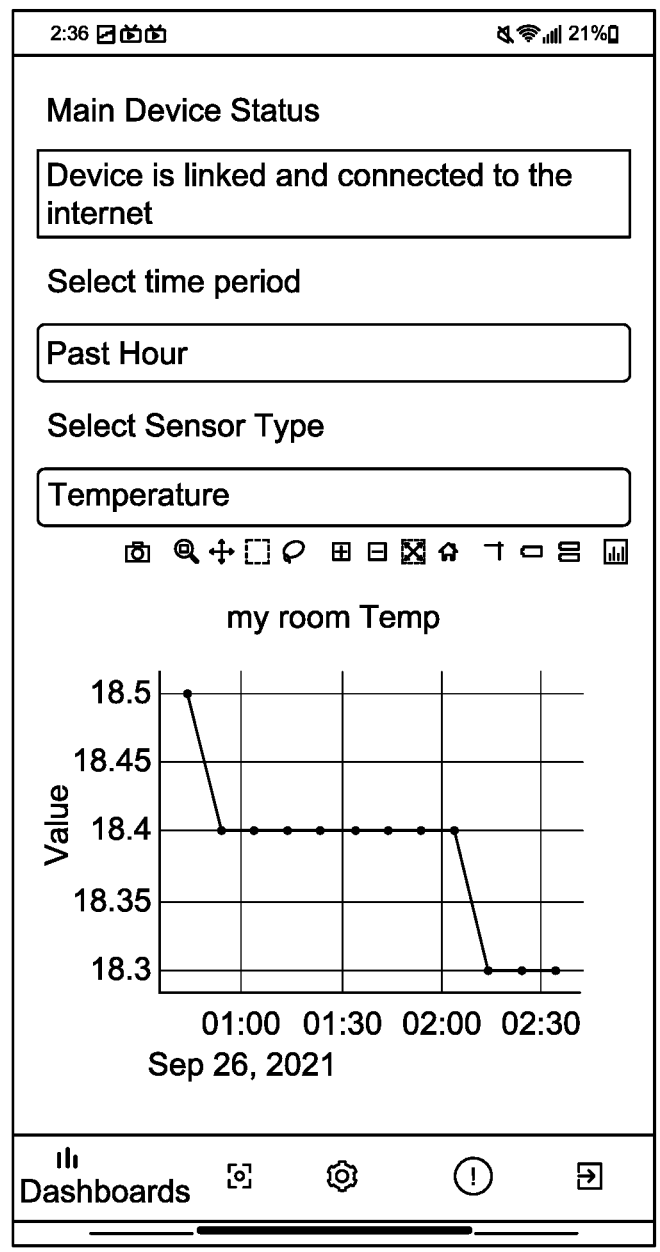
FIG. 11 is a GUI of the mobile application illustrating readings from the sensors, according to certain embodiments.

FIG. 9 illustrates screenshot of android mobile application used to sign-up and sign-in to the user account and establish the connection with the access point 156. FIG. 10 illustrates a screenshot of the android mobile application showing sensor setting interface. Similar to the web application as illustrated in FIG. 5, the user may be allowed to control all the sensors 102 via the mobile application alternatively. FIG. 11 illustrates a screenshot of the android mobile application showing sensor reading interface, where the user may be allowed to navigate between various sensors and obtain a visual statistics of the corresponding readings. Additionally, through this interface, the user may be allowed to assign the anomaly detection model for each sensor 102.

Figure 12:
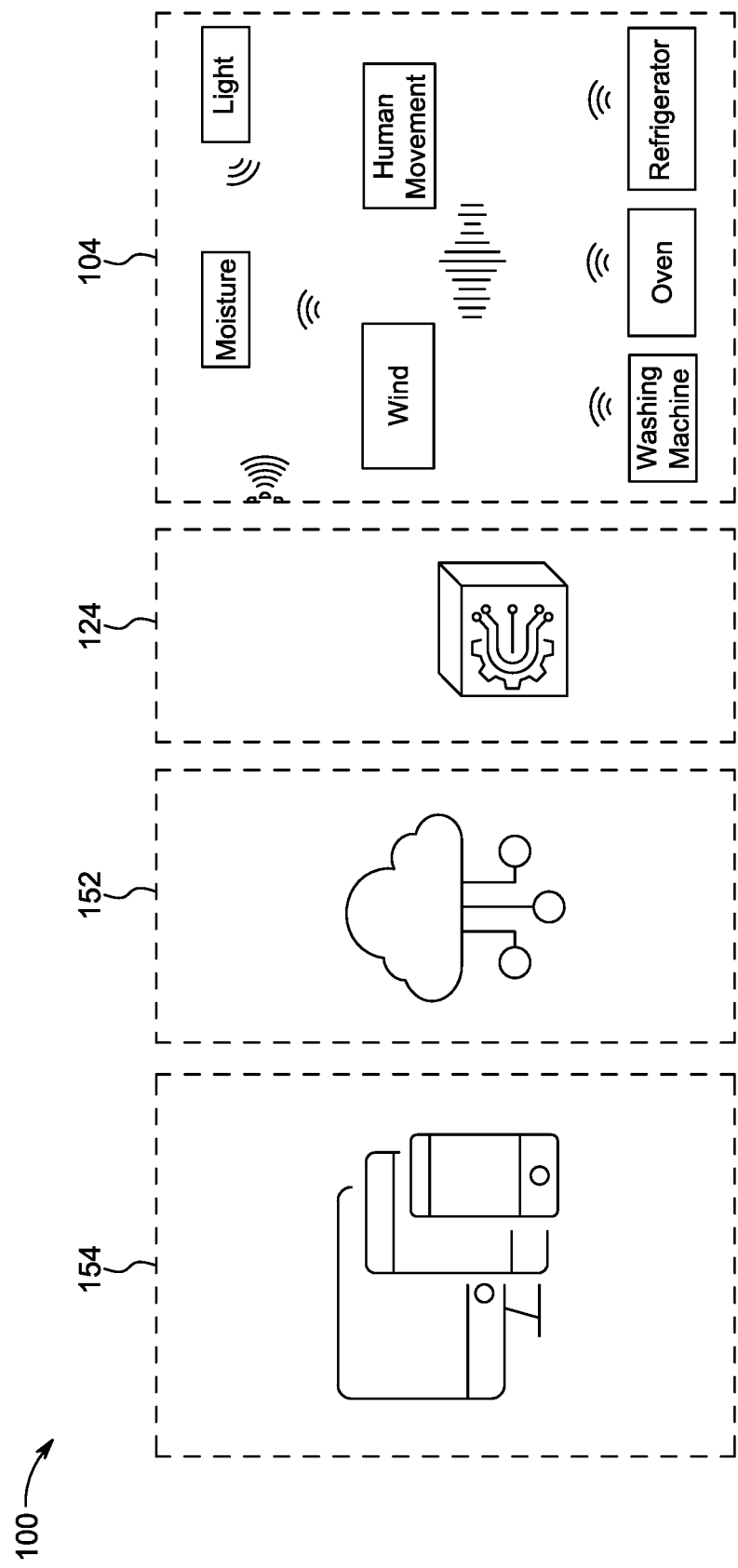
FIG. 12 a schematic diagram of the anomaly detection system including smart features, according to certain embodiments.

FIG. 12 illustrates a schematic diagram of the system 100 including smart features. As illustrated in FIG. 12, the user-selected environment 104 may include, but not limited to, a washing-dryer machine, an oven, a refrigerator, an audio device, a motion sensor, a light sensor, a water level sensor as the smart features. Each of the washing-dryer machine, the oven, the refrigerator, and the audio device may include a sensor. In one example, the washing-dryer machine may include the vibration sensor 120 to sense the level of vibration during operation thereof, the refrigerator may include the humidity sensor 112 to sense the amount of humidity in the air entering the refrigerator when the door of the refrigerator is opened, the oven may include the moisture sensor 116 to sense the amount of moisture in the food placed therein, and the like. Each of these sensors 102 may transmit the data to the main device 124 which is further shared with the user via the cloud storage 152 and the end user communications device 154. As such, anomaly in functioning of any of the smart features may be determined and the user may be allowed to take appropriate action to remedy the anomaly.

Figure 13:
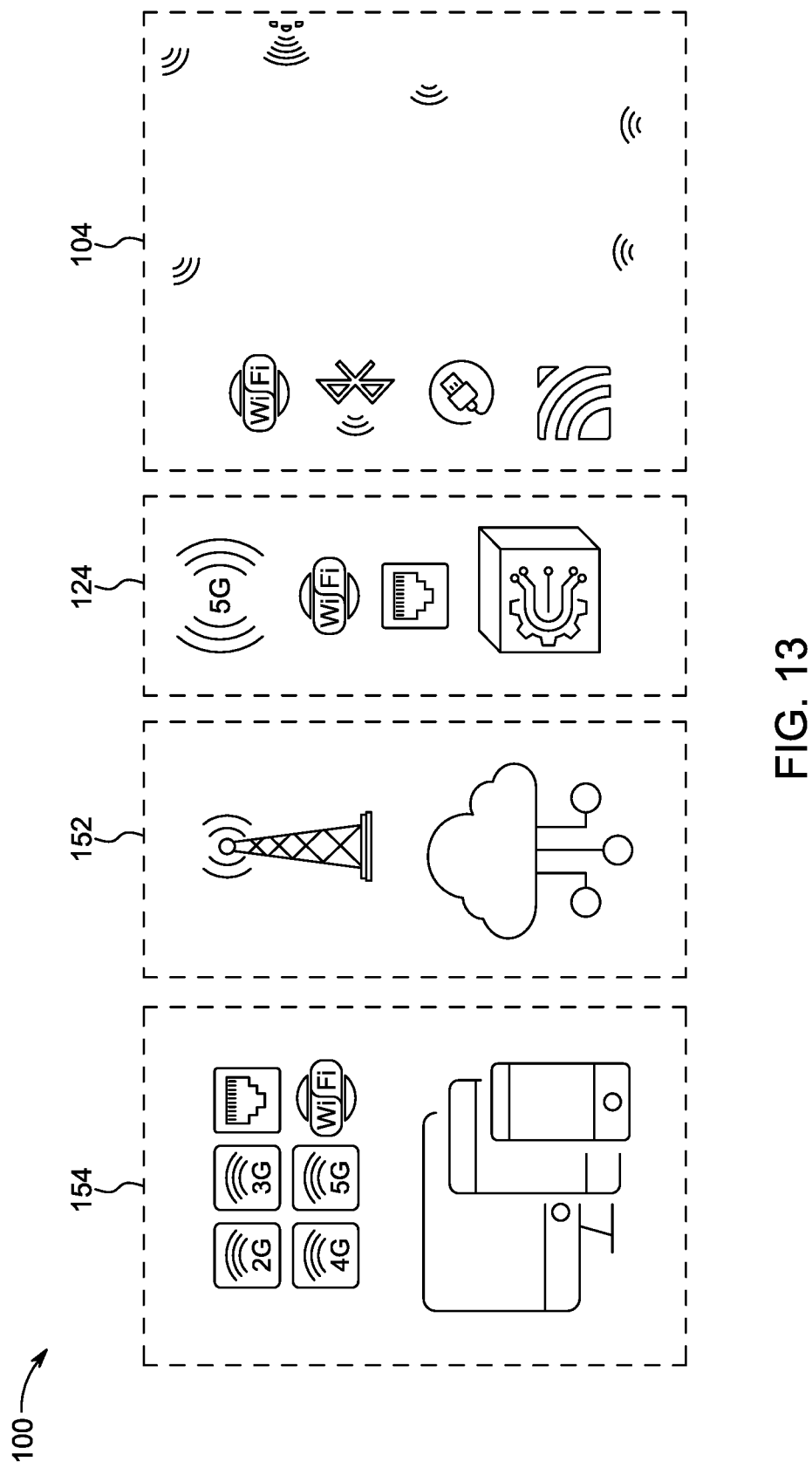
FIG. 13 illustrates a schematic diagram of the anomaly detection system equipped with various mean of connectivity, according to certain embodiments.

FIG. 13 illustrates a schematic diagram of the system 100 equipped with various means of connectivity. In an embodiment, the sensors 102 in the user-selected environment 104 may transmit the data to the main device 124 via one of, but are not limited to, WiFi, Bluetooth, USB, or other known wired or wireless connections. The main device 124 may be configured to communicate with the sensors 102 via one of, but are not limited to, 5G technology, Bluetooth, WiFi, or LAN. The cloud storage 152 may be configured to establish a connection with the main device 124 and the end user communications device 154 via an antenna tower or a base transceiver station. The end user communications device 154 may be configured to establish the connectivity with the cloud storage 152 and the main device 124 via one of, but are not limited to, 2G technology, 3G technology, 4G technology, 5G technology, LAN, or WiFi.

Figure 14:
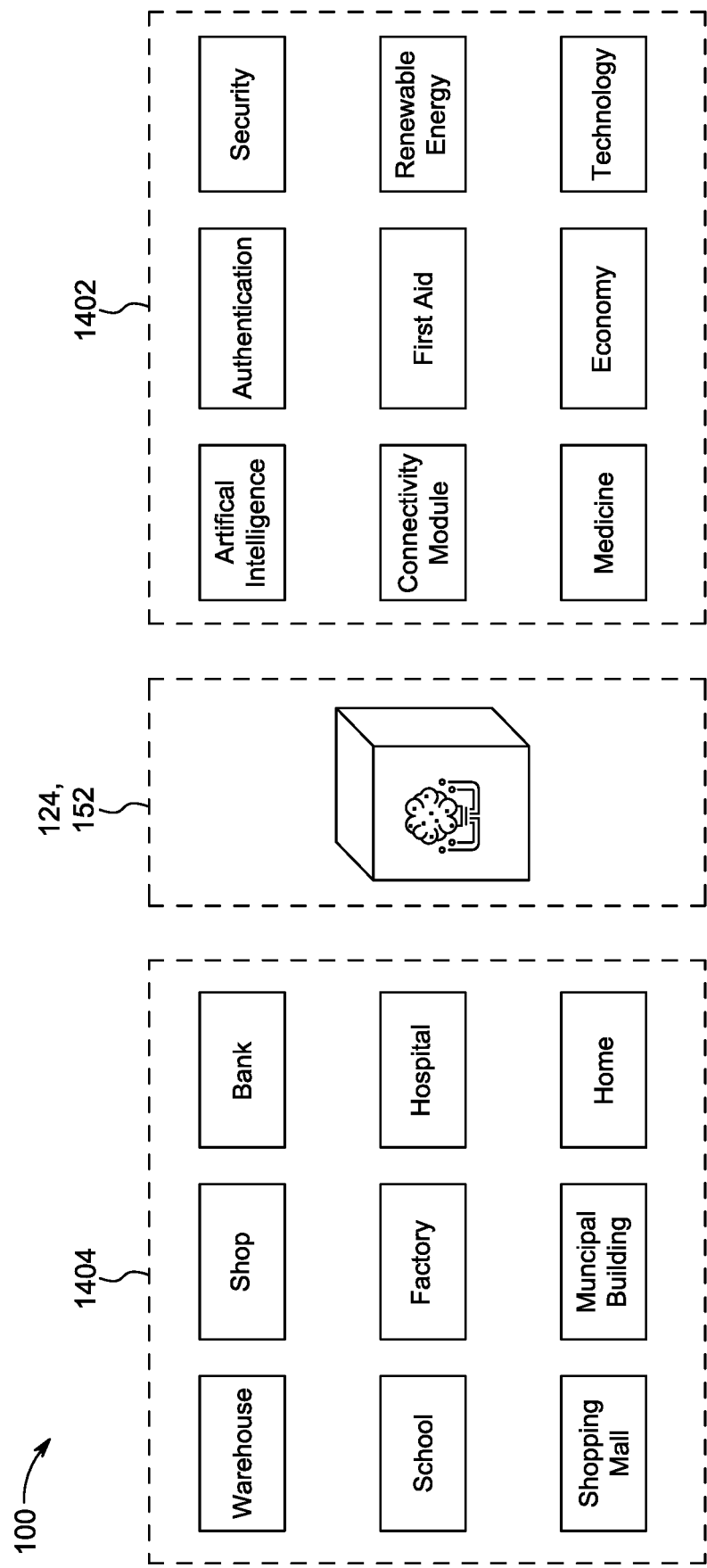
FIG. 14 is a schematic diagram illustrating implementation of the anomaly detection system in various domains and applications, according to certain embodiments.

FIG. 14 is a schematic diagram illustrating implementation of the system 100. In an aspect, the system 100 may be configured to connect multiple domains 1402 with corresponding applications 1404. The domains 1402 may include, but are not limited to, artificial intelligence, healthcare, clinical studies, monetary module, green power, safety modules, and the like. The applications 1404 may include, but are not limited to, bank, hospital, house, industries, offices, shops, warehouse, and the like. The system 100 may help connect the application 1404 with a required domain 1402 to identify anomalies. For example, the user-selected environment 104 may be a medicine storage unit. Multiple sensors 102, such as the humidity sensor 112, the temperature sensor 114, the moisture sensor 116, and the vibration sensor 120 may be located in the medicine storage unit. One or more end user communications devices 154 may be located in a related application 1404, such as the hospital. The end user communications devices 154 at the hospital may receive data from each of the sensors 102 located in the medicine storage unit and the presence of anomaly may be communicated by the main device 124 to the end user communications devices 154.

Figure 15:
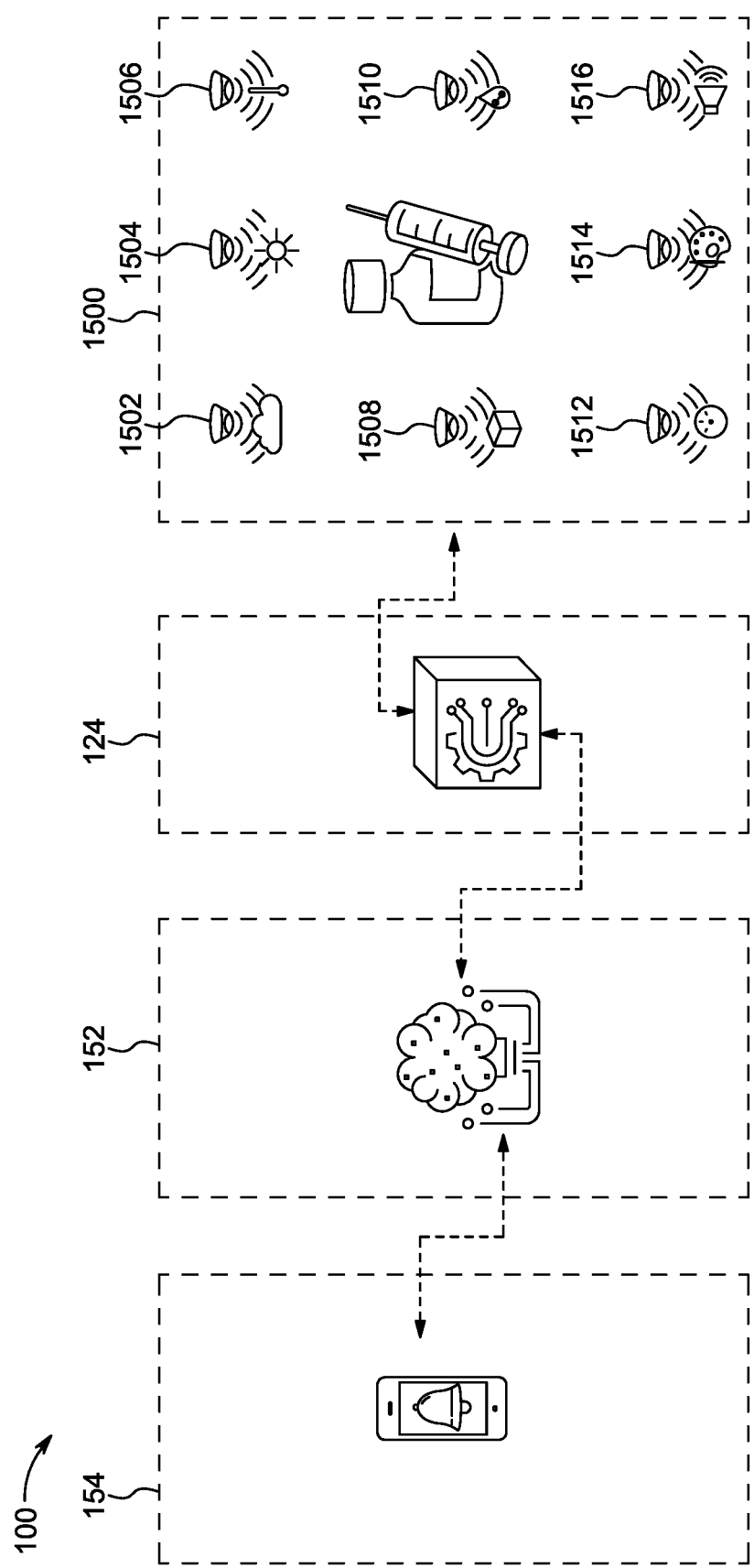
FIG. 15 is an exemplary schematic diagram of the anomaly detection system implemented for monitoring a COVID-19 vaccine, according to certain embodiments.

FIG. 15 is an exemplary schematic diagram of the system 100 implemented for monitoring COVID-19 vaccine. The user-selected environment 104 may be an enclosed space 1500 where the COVID-19 vaccine is stored. The user-selected environment 104 may include the humidity sensor 1502 to sense amount of humidity in the enclosed space, a light sensor 1504 to sense amount of light in the enclosed space, a temperature sensor 1506 to sense the temperature of the enclosed space, an object sensor 1508 to sense presence of objects others than the COVID-19 vaccine boxes in the enclosed space, a water sensor 1510, a weight sensor 1512, a color sensor 1514, and a sound sensor 1516. Each of these sensors 102 transmits the data to the main device 124 based on a time-step update (alternatively referred to as the publishing time period in the present disclosure). Based on the data received from the sensors 102, the trained machine learning model in the main device 124 is configured to determine anomalies with respect to the parameters corresponding to the sensors 102. For example, the main device 124 may check for presence of anomalies with respect to, but are not limited to, temperature, weight, color, and darkness. Further, the cloud storage 152 may communicate the data from the main device 124 to the end user communications device 154, along with terms or phrases corresponding to each data, such that the user may easily understand. For example, the terms or phrases may include "No light", "Glass sound", "Watercolor", or "Temperature always −70 C". The anomaly report from the cloud storage 152 may emphasize on the anomalies, such as "Temperature NOT [−70 C]". Certain anomalies may be considered as normal by the user and may accordingly be communicated to the main device 124 as a feedback signal to retrain the trained machine learning model. For other reported anomalies, the user may visit the enclosed space 1500 to rectify the anomaly.

Figure 16:
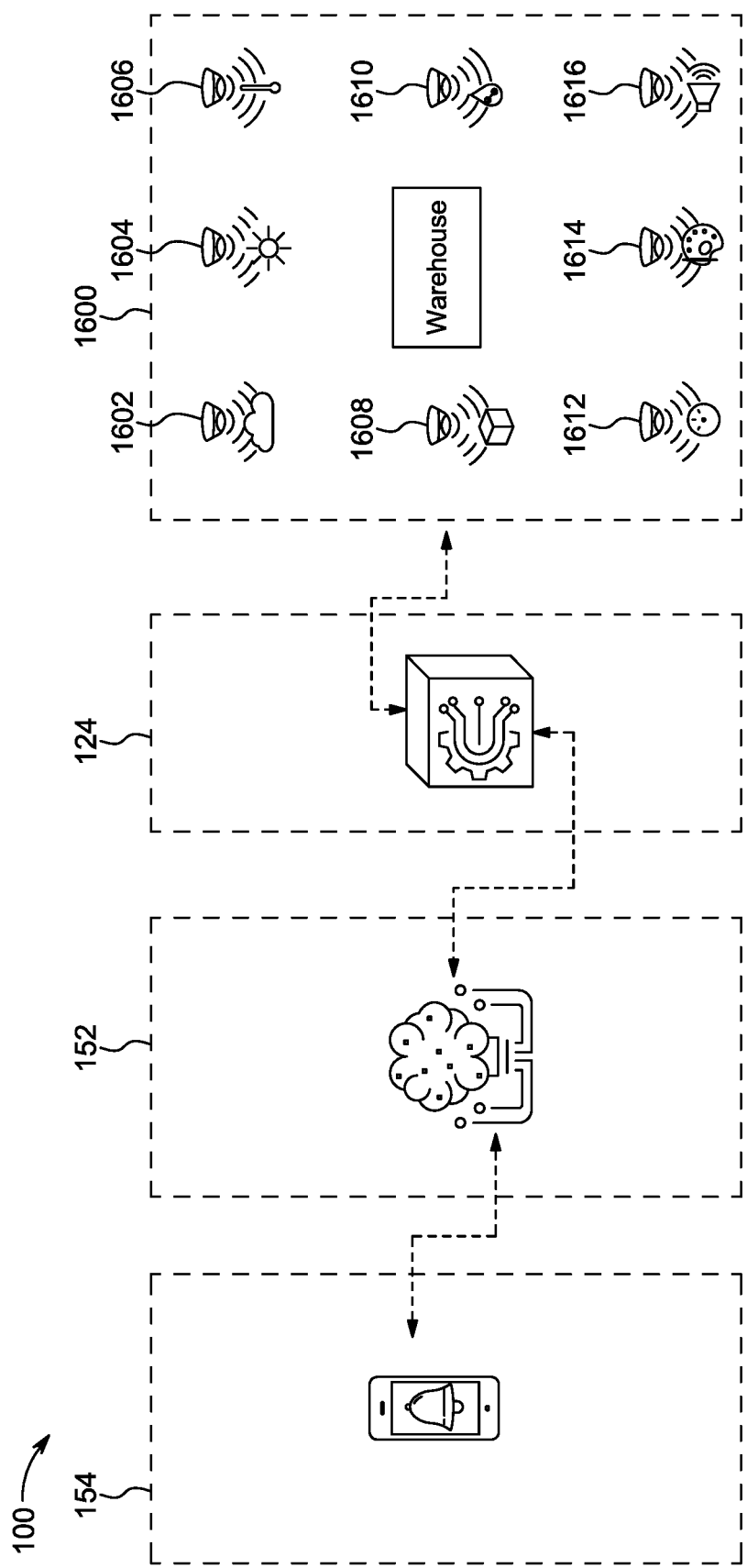
FIG. 16 is an exemplary schematic diagram of the anomaly detection system implemented for monitoring a warehouse, according to certain embodiments.

FIG. 16 is an exemplary schematic diagram of the system 100 implemented for monitoring a warehouse 1600. The user-selected environment 104 in this case is the warehouse 1600 that stores goods and includes multiple sensors 102, such as a humidity sensor 1602, a light sensor 1604, a temperature sensor 1606, an object sensor 1608, a water sensor 1610, a weight sensor 1612, a color sensor 1614, and a sound sensor 1616. These sensors are configured to transmit data to the main device 124, where the data includes readings corresponding to, but are not limited to, temperature in the warehouse 1600, activity of people in the warehouse 1600, movement of machines in the warehouse 1600, movement of goods in the warehouse 1600, and sounds in the warehouse 1600. The cloud storage 152 may associate each data with terms or phrases, such as "Usually quite every Sunday", "Light is always ON", and "Temperature 25C". The report from the main device 124 along with these terms and phrases are communicated to the user via the end user communications device 154. In case of presence of an anomaly, the same may be indicated to the user. For example, the anomalies may be communicated as "temperature NOT normal", "Dark", or "Small object moved". Certain anomalies may be considered as normal by the user and may accordingly be communicated to the main device 124 as a feedback signal to retrain the trained machine learning model. For other reported anomalies, the user may visit the warehouse 1600 to rectify the anomaly.

Figure 17:
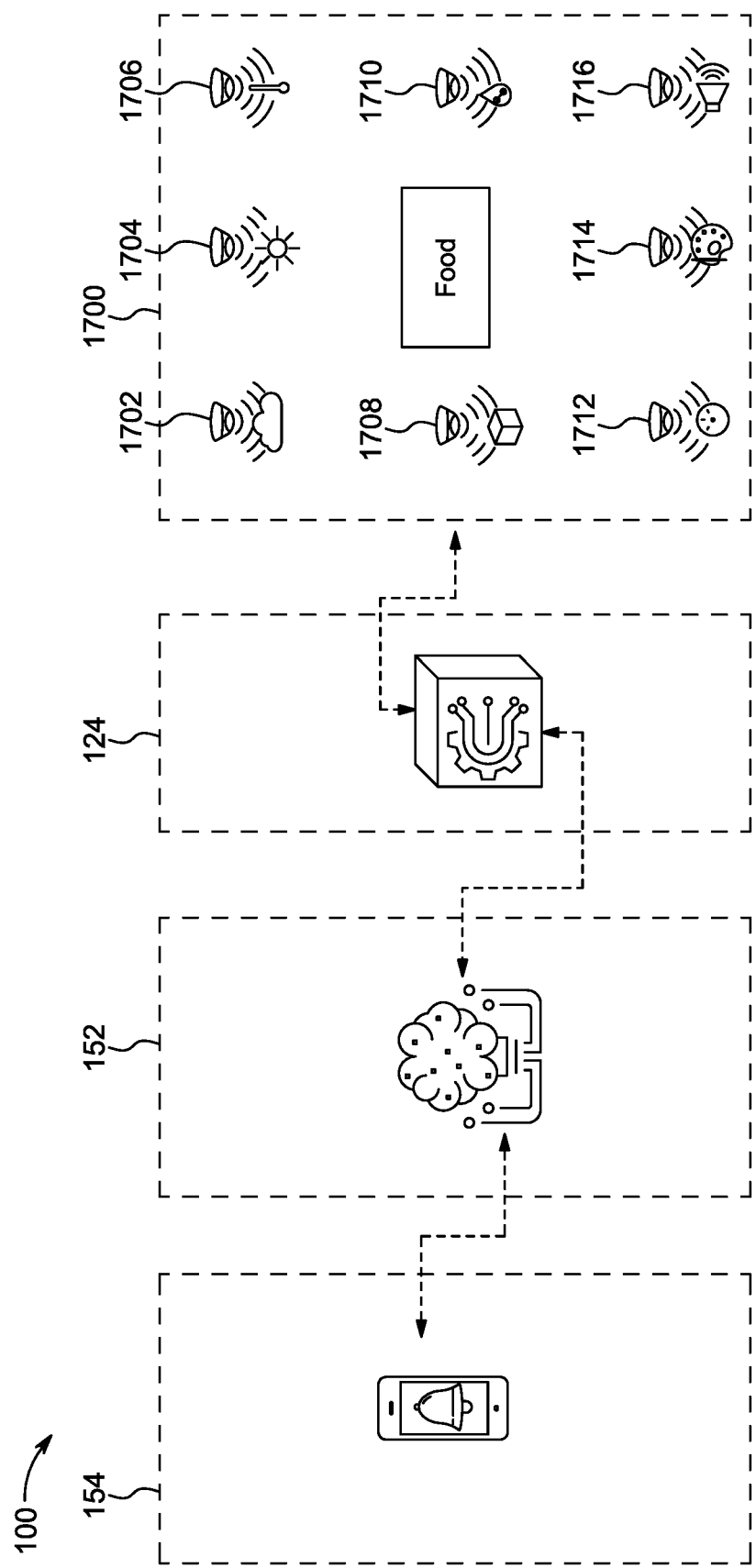
FIG. 17 is an exemplary schematic diagram of the anomaly detection system implemented for monitoring a food pantry, according to certain embodiments.

FIG. 17 is an exemplary schematic diagram of the system 100 implemented for monitoring a food pantry 1700. The user-selected environment 104 in this case is the food pantry 1700 that stores food and ingredients required to prepare the food. The food pantry 1700 includes multiple sensors, such as a humidity sensor 1702, a light sensor 1704, a temperature sensor 1706, an object sensor 1708, a water sensor 1710, a weight sensor 1712, a color sensor 1714, and a sound sensor 1716. These sensors are configured to transmit data to the main device 124, where the data includes readings corresponding to, but are not limited to, temperature in the food pantry 1700, humidity in the food pantry 1700, concentration of oxygen against concentration of carbon-dioxide in the food pantry 1700, and amount of light in the food pantry 1700. The cloud storage 152 may associate each data with terms or phrases, such as "usually dry", "usually dark", "temperature 5C", or "Person size movement". The report from the main device 124 along with these terms and phrases are communicated to the user via the end user communications device 154. In case of presence of the anomaly, the same may be indicated to the user. For example, the anomalies may be communicated as "Very humid", "Very bright for few hours", or "Mouse size object moved". Certain anomalies may be considered as normal by the user and may accordingly be communicated to the main device 124 as a feedback signal to retrain the trained machine learning model. For other reported anomalies, the user may visit the food pantry 1700 to rectify the anomaly.

Figure 18:
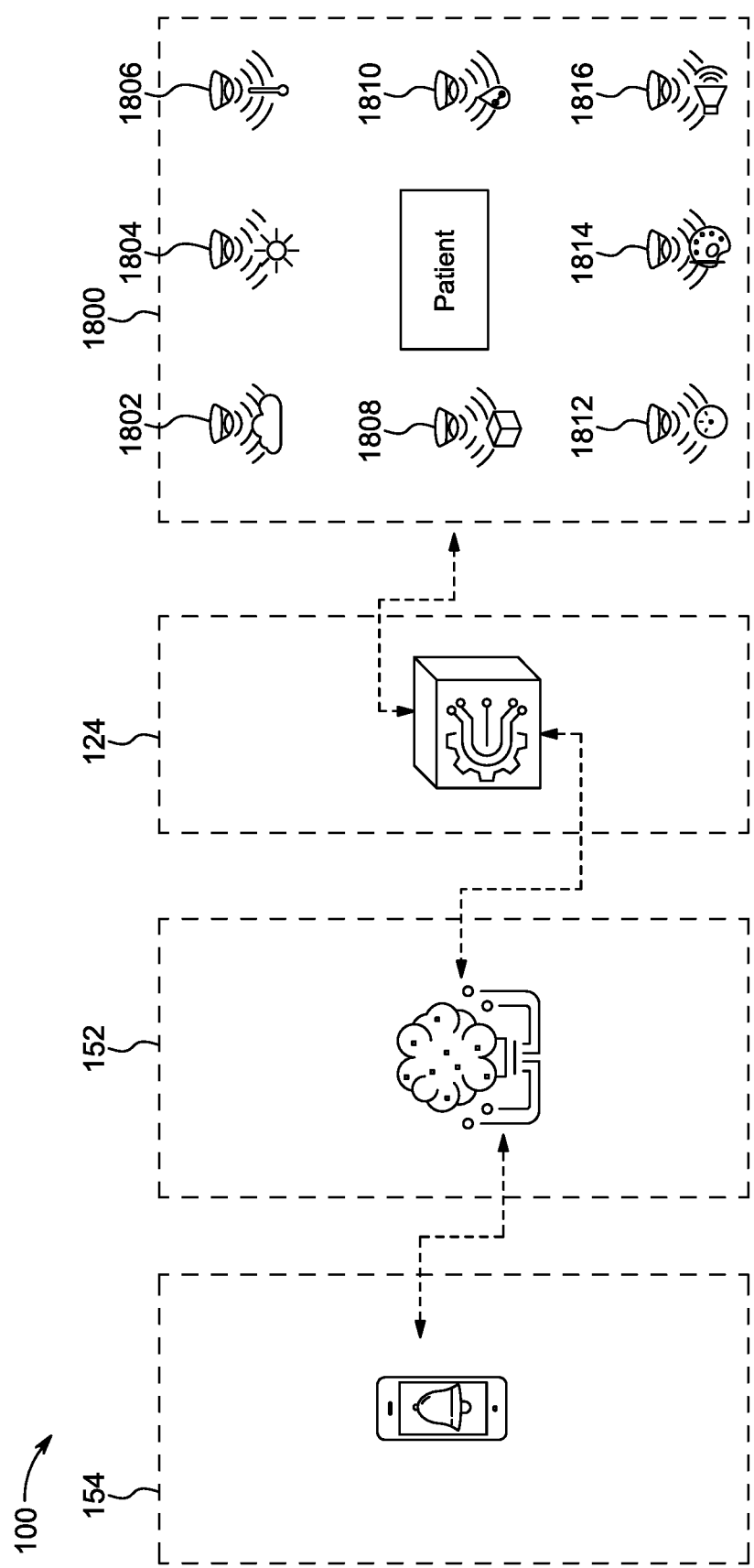
FIG. 18 is an exemplary schematic diagram of the anomaly detection system implemented for monitoring a patient room, according to certain embodiments.

FIG. 18 is an exemplary schematic diagram of the system 100 implemented for monitoring a patient room 1800. The user-selected environment 104 in this case is the patient room 1800 that accommodates multiple patients. The patient room 1800 may also be located in the residence of the user and may be used to accommodate family members of the user. Alternatively, the patient room 1800 may be an intensive care unit in a hospital. The patient room 1800 may include multiple sensors, such as a humidity sensor 1802, a light sensor 1804, a temperature sensor 1806, an object sensor 1808, a water sensor 1810, a weight sensor 1812, a color sensor 1814, and a sound sensor 1816. These sensors are configured to transmit data to the main device 124, where the data includes readings corresponding to, but are not limited to, temperature in the patient room 1800, humidity in the patient room 1800, carbon-dioxide level in the patient room 1800, light pattern in the patient room 1800, and bed weight pressure. The cloud storage 152 may associate each data with terms or phrases, such as "usually dry and cool", "CO2=400 ppm", "temperature 25C", or "Person size movement". The report from the main device 124 along with these terms and phrases are communicated to the user via the end user communications device 154. In case of presence of the anomaly, the same may be indicated to the user. For example, the anomalies may be communicated as "Very hot/humid", "CO2>600 ppm", or "Empty bed for hours". Certain anomalies may be considered as normal by the user and may accordingly be communicated to the main device 124 as a feedback signal to retrain the trained machine learning model. For other reported anomalies, the user may visit the patient room 1800 to rectify the anomaly.

Figure 19:
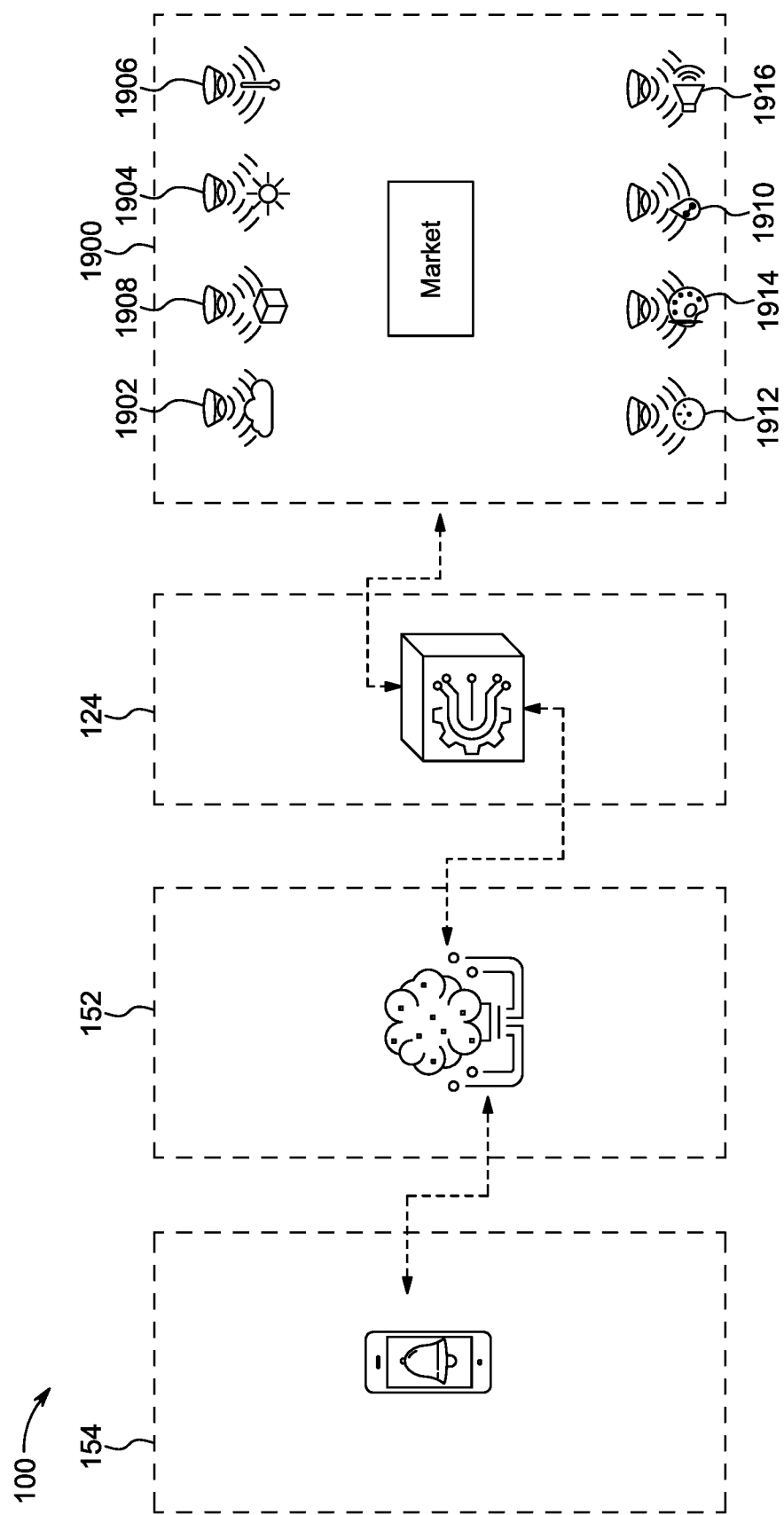
FIG. 19 is an exemplary schematic diagram of the anomaly detection system implemented for monitoring an indoor greenhouse, according to certain embodiments.

FIG. 19 is an exemplary schematic diagram of the system 100 implemented for monitoring an indoor greenhouse 1900. The user-selected environment 104 in this case is the indoor greenhouse 1900 that houses multiple plants. The indoor greenhouse 1900 may include multiple sensors, such as a humidity sensor 1902, a light sensor 1904, a temperature sensor 1906, an object sensor 1908, a water sensor 1910, a weight sensor 1912, a color sensor 1914, and a sound sensor 1916. These sensors are configured to transmit data to the main device 124, where the data includes readings corresponding to, but are not limited to, temperature in the indoor greenhouse 1900, soil humidity in the indoor greenhouse 1900, carbon-dioxide level in the indoor greenhouse 1900, brightness in the indoor greenhouse 1900, and object motion in the indoor greenhouse 1900. The cloud storage 152 may associate each data with terms or phrases, such as "wet soil", "CO2=700 ppm", "temperature 15C to 35C", or "Person size movement". The report from the main device 124 along with these terms and phrases are communicated to the user via the end user communications device 154. In case of presence of the anomaly, the same may be indicated to the user. For example, the anomalies may be communicated as "Very hot/dry", "CO2<200 ppm", or "Animal size motion". Certain anomalies may be considered as normal by the user and may accordingly be communicated to the main device 124 as a feedback signal to retrain the trained machine learning model. For other reported anomalies, the user may visit the indoor greenhouse 1900 to rectify the anomaly.

Figure 20:
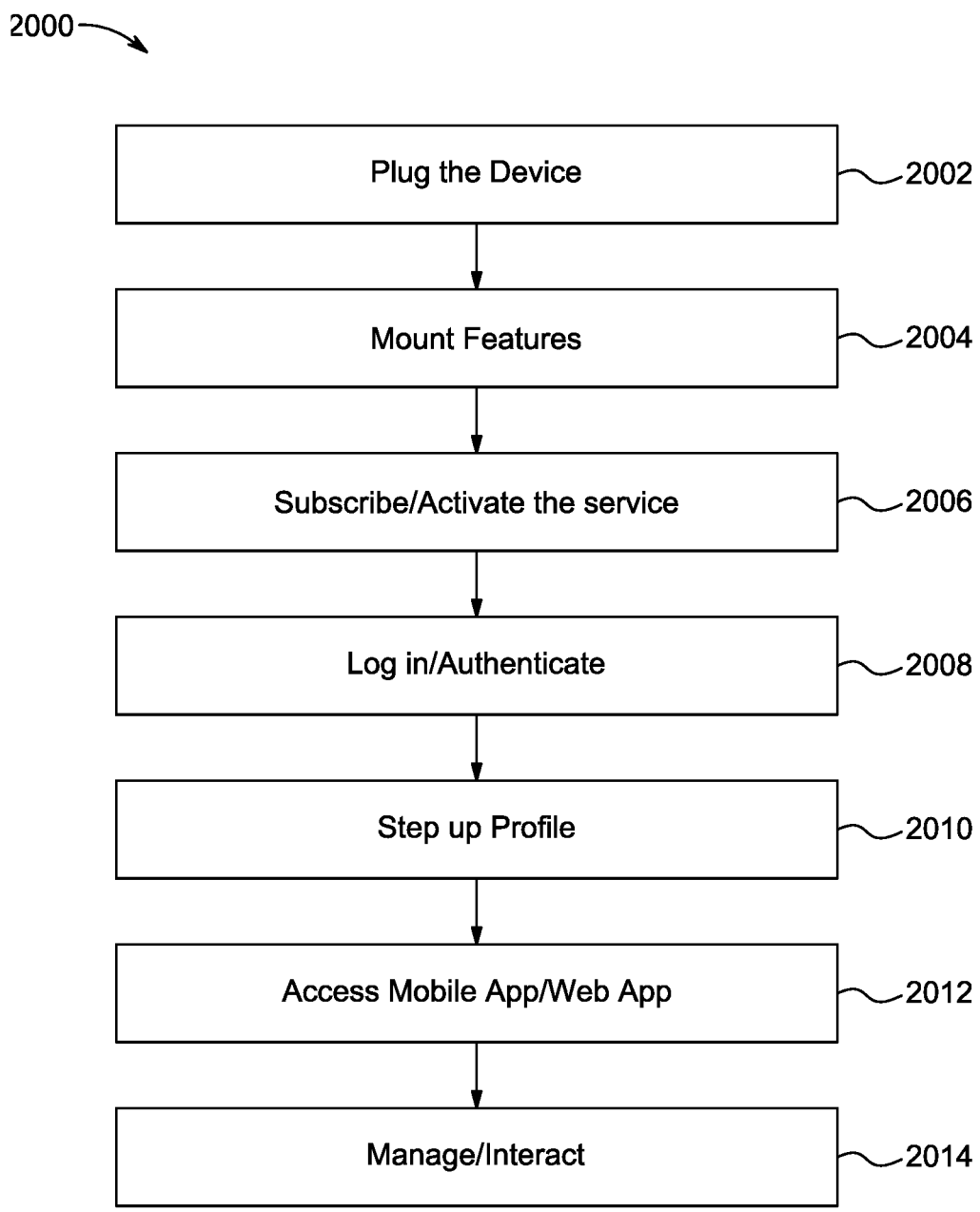
FIG. 20 is a flowchart of a method of installing and actuating the anomaly detection system, according to certain embodiments.

FIG. 20 is a flowchart of a method 2000 of installing and actuating the system 100. At step 2002, the main device 124 is plugged into a power source. As described with respect to FIG. 1, the main device 124 includes the motherboard 126, the microprocessor 128, the chargeable battery 134, the WiFi connection unit 138 which require power supply for operation thereof.

At step 2004, the sensors 102 are mounted within the user-selected environment 104. In an aspect, required and appropriate sensors 102 may be mounted within the user-selected environment 104.

At step 2006, the service of the main device 124 may be activated, such that the main device 124, such as the Raspberry pi, may fetch details from the sensors 102.

At step 2008, the user logs-in to the auxiliary device 200 and provides login credentials to be authenticated at the MQTT broker.

At step 2010, the user creates a profile in the MQTT broker and maps the sensors 102 to the profile.

At step 2012, the user accesses the mobile application or the web application via the end user communications device 154.

At step 2014, the user is allowed to manage and control the sensors 102 mapped to the profile and interacts with the main device 124 in response to anomaly reports.

Figure 21:
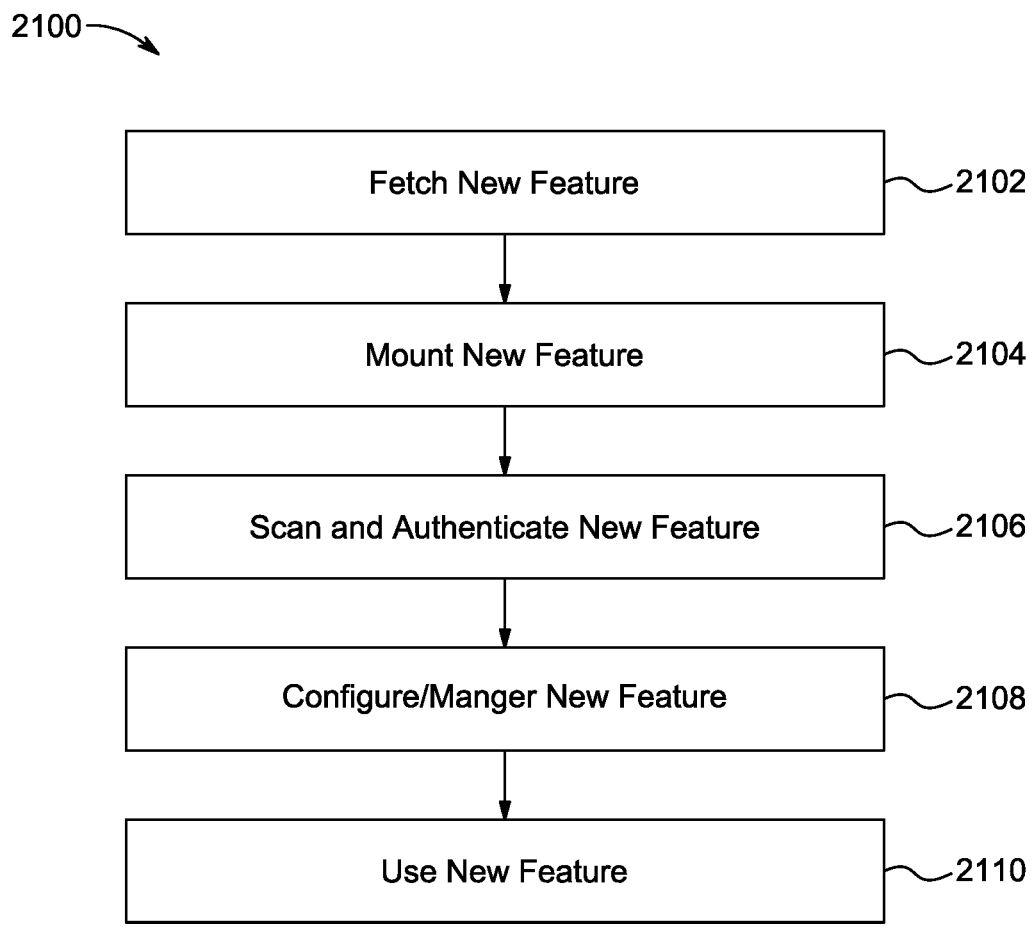
FIG. 21 is a flowchart of a method of adding new sensors to a user-selected environment of the anomaly detection system, according to certain embodiments.

FIG. 21 is a flowchart of a method 2100 of adding new sensors to the set of sensors in the user-selected environment 104. At step 2102, the new sensor (alternatively referred to as "feature" in the present disclosure) is selected for the user-selected environment 104. In an aspect, a sensor being moved from one user-selected environment 104 to another user-selected environment 104 may be treated as the new sensor in the destination.

At step 2104, the new sensor is mounted at a desired location determined by the user in the user-selected environment 104.

At step 2106, the main device 124 receives the data from the new sensor and determines the details thereof. The main device 124 communicates the details of the new sensor and the corresponding user-selected environment 104 to the user via the end user communications device 154. Once the user accepts the addition of the new sensor, the main device 124 authenticates the new sensor and includes the new sensor to the list of sensors 102 in the user-selected environment 104.

At step 2108, the user is allowed to configure and manage the new sensor once the new sensor is authenticated by the main device 124 and added to the profile. In an aspect, the user may assign the anomaly detection model to the new sensor.

At step 2110, the new sensor is allowed to transmit the data to the access point 156 of the main device 124.

Figure 22:
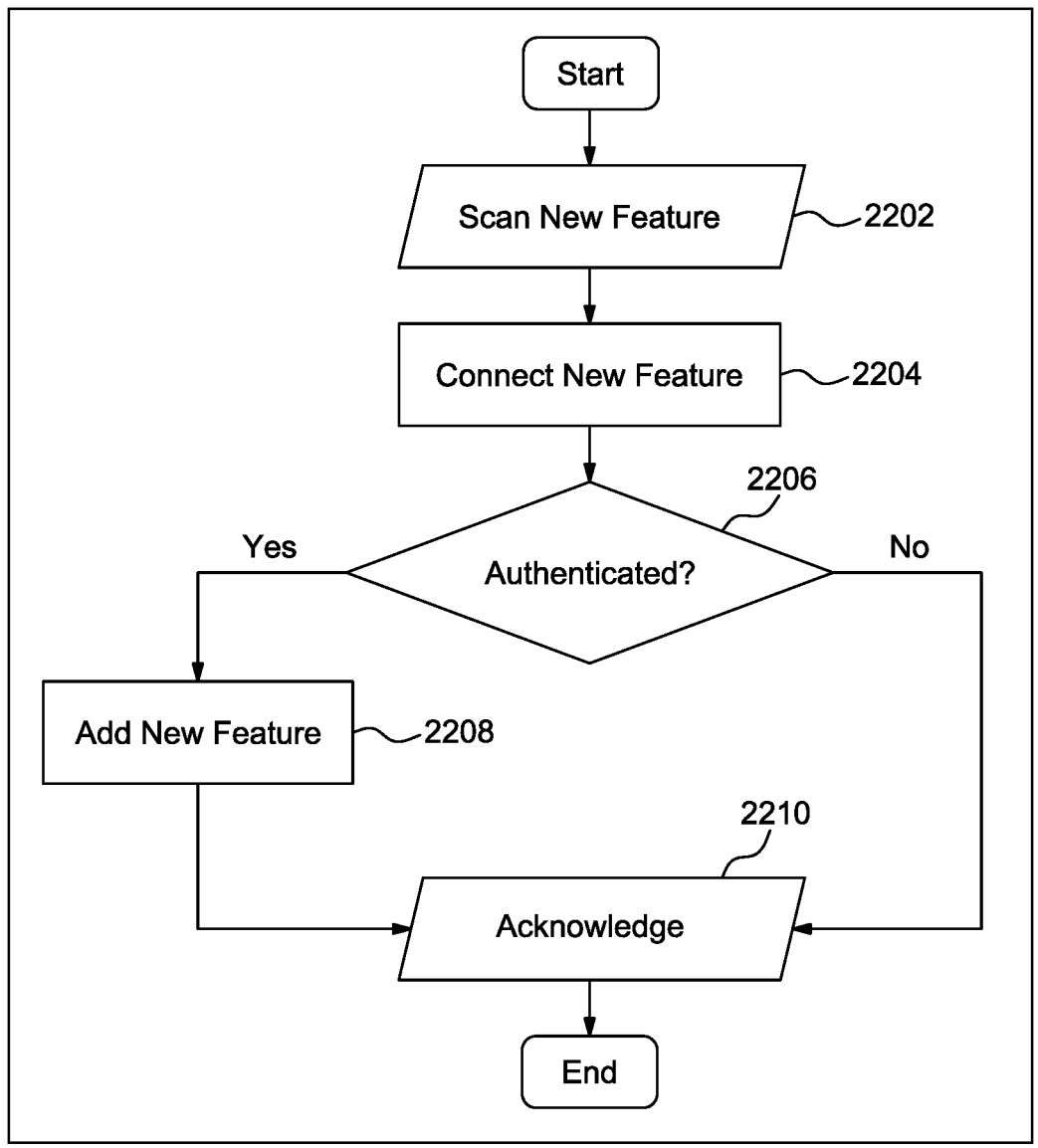
FIG. 22 is a flowchart of a method of authenticating the new sensor of FIG. 21, according to certain embodiments.

FIG. 22 is a flowchart of a method 2200 of authenticating the new sensor. At step 2202, the main device 124 scans the details of the new sensor included in the user-selected environment 104, based on the data packets received from the new sensor.

At step 2204, the main device 124 establishes a connection between the access point 156 and the new sensor. Details of the new sensor is communicated to the user via the cloud storage 152.

At step 2206, the main device 124 checks whether the new sensor was authenticated by the user. For example, the user may click on "Accept" option in the dashboard of the mobile application to authenticate the new sensor.

If the new sensor is authenticated, at step 2208, the main device 124 adds the new sensor to the list of sensors 102 already present in the user-selected environment 104 and provides an acknowledgement, at step 2210, to the user regarding the addition of the new sensor. If the addition of the new sensor is rejected by the user, the main device 124 provides the acknowledgement of the removal of the new sensor from the list of sensors 102.

Figure 23:
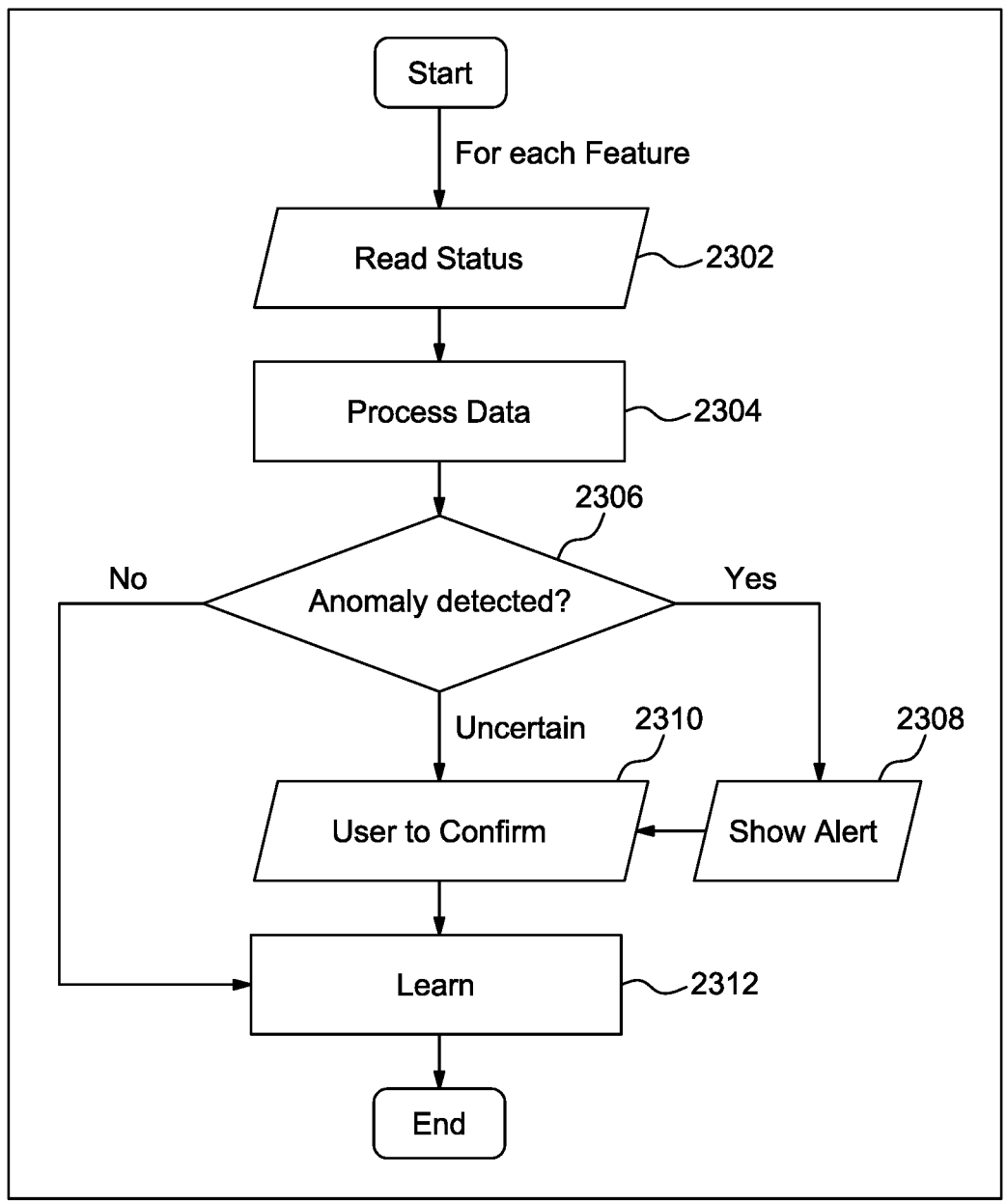
FIG. 23 is a flowchart of a method of detecting anomaly, according to certain embodiments.

FIG. 23 is a flowchart of a method 2300 of detecting an anomaly corresponding to a feature. For each sensor 102, at step 2302, the main device 124 reads a status of the sensor 102. At any time, as desired by the user, the status of the sensor 102 may be changed from 'accepted' to 'rejected' or 'deleted'. As such, the main device 124 checks the status of each sensor 102.

At step 2304, the main device 124 processed the data received from the sensor 102.

At step 2306, the main device 124 determines the presence of anomaly in the data received from the sensor 102.

If the main device 124 detects an anomaly, at step 2308, the main device 124 provides an alert to the user on the end user communications device 154 via the cloud storage 152.

At step 2310, the user is allowed to confirm if such anomaly report is true or if the readings are normal. In both the cases of confirmation from the user and rejection from the user in response to the alerted anomaly, at step 2312, the trained machine learning model in the main device 124 is retrained.

If the main device 124, at step 2306, is uncertain of determining certain data points as anomaly, the main device 124 notifies such data to the user and requests the user, at step 2308, to confirm if such data should be considered as anomaly. Based on the feedback from the user, the trained machine learning model in the main device 124 is retrained.

If the main device 124, at step 2306, does not detect any anomaly from the readings, the main device 124, at step 2312, trains the trained machine learning model based on the readings.

Once the device is implemented in the environment, it starts to collect data value from sensors for specific duration (interval time) until it reaches an accuracy threshold. The duration value varies depending on the sensor, environment, or user preferences (e.g., 5 mins, 1 hr, 5 secs . . . etc.). For example, at every interval time it will read the values from sensors. Then, the collected values will be stored in a cloud storage until it reaches the accuracy threshold (for example 10,000 values). The interval time and the threshold can be adjusted based on the user need. These values are then used to feed an unsupervised machine learning algorithm to build a model capable of recognizing the normality and predicting the anomalies. Once the model is self-built, it is used with an expert domain to validate the prediction given by the machine learning algorithm model prior to feed it back to the machine learning model. The values are stored in the database, with the validated output generated by the expert domain. Following that, the model is retrained using the newly stored values in order to improve its performance in the future by exposing it to up-to-date anomalies.

Figure 24:
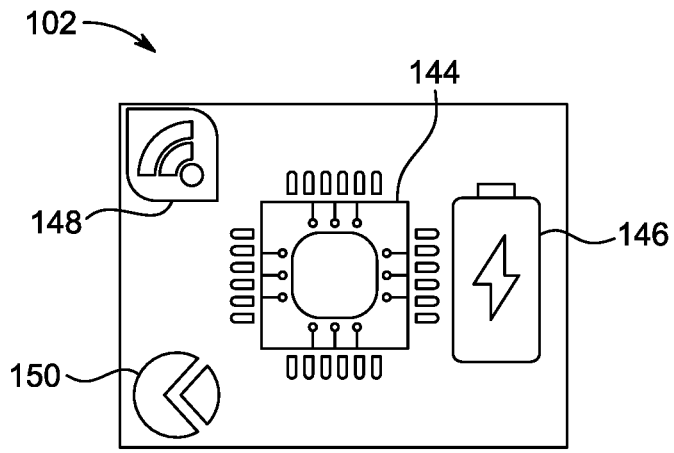
FIG. 24 is a symbolic representation of components of the sensor used in the anomaly detection system, according to certain embodiments.
Figure 25:
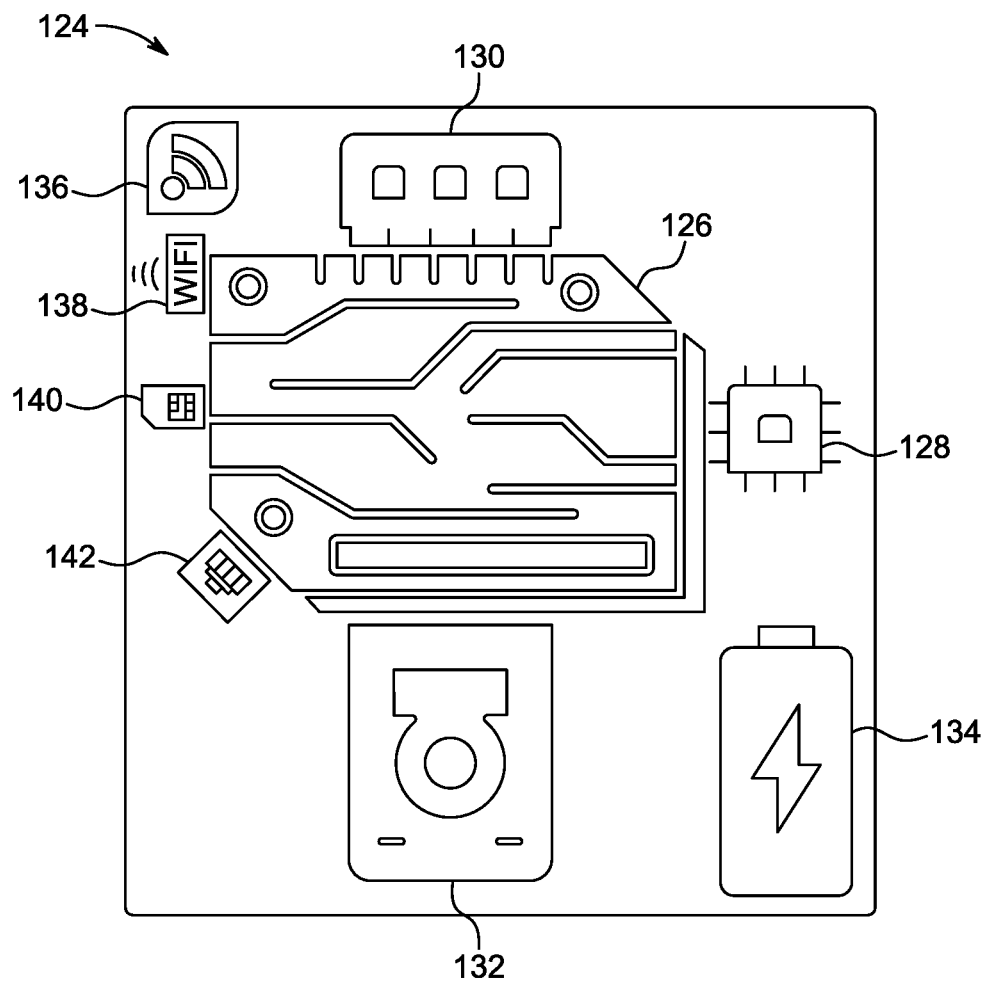
FIG. 25 is a symbolic representation of components of a main device of the anomaly detection system, according to certain embodiments.

FIG. 24 is a symbolic representation of components of the sensor 102 and FIG. 25 is a symbolic representation of components of the main device 124.

Figure 26B:
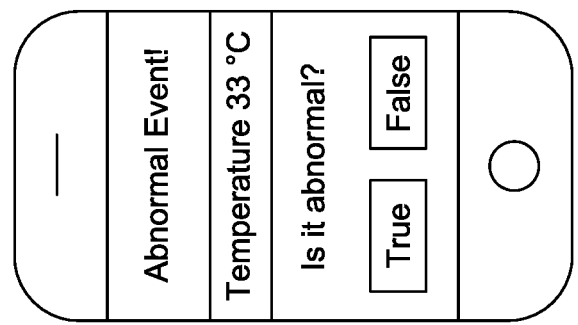
FIG. 26B is an illustration of the GUI of the mobile application depicting options made available to the user to interact with the main device, according to certain embodiments.
Figure 26A:
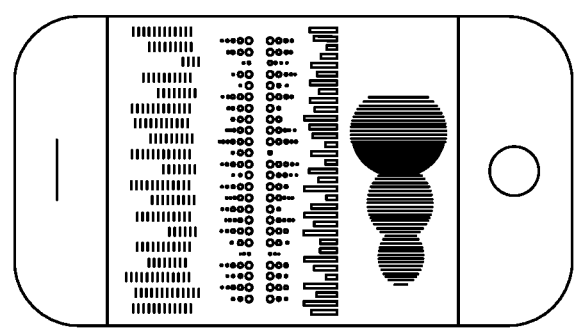
FIG. 26A is an exemplary illustration of the GUI of the mobile application depicting monitoring of data from sensors, according to certain embodiments.

FIG. 26A is an exemplary illustration of a graphic user interface (GUI) of the android mobile application depicting monitoring of data from sensors 102 and FIG. 26B is an illustration of the GUI of the android mobile application depicting options made available to the user to interact with the main device 124. In some embodiments, as described earlier, the data of each sensor 102 and anomaly reports may be made available to the user in form of the dashboard. The dashboard allows the user an overview showing a total number of anomalies detected, a total number of data point processed, and/or an anomaly rate for the processed data. This will allow the user to determine if there are significant problems with the sensors 102 or the user-selected environment 104. For example, if 100 data points out of 100 data packets received from the sensors 102 indicate anomalous behavior, then there is likely an issue that needs urgent addressing by the user.

Figure 27:
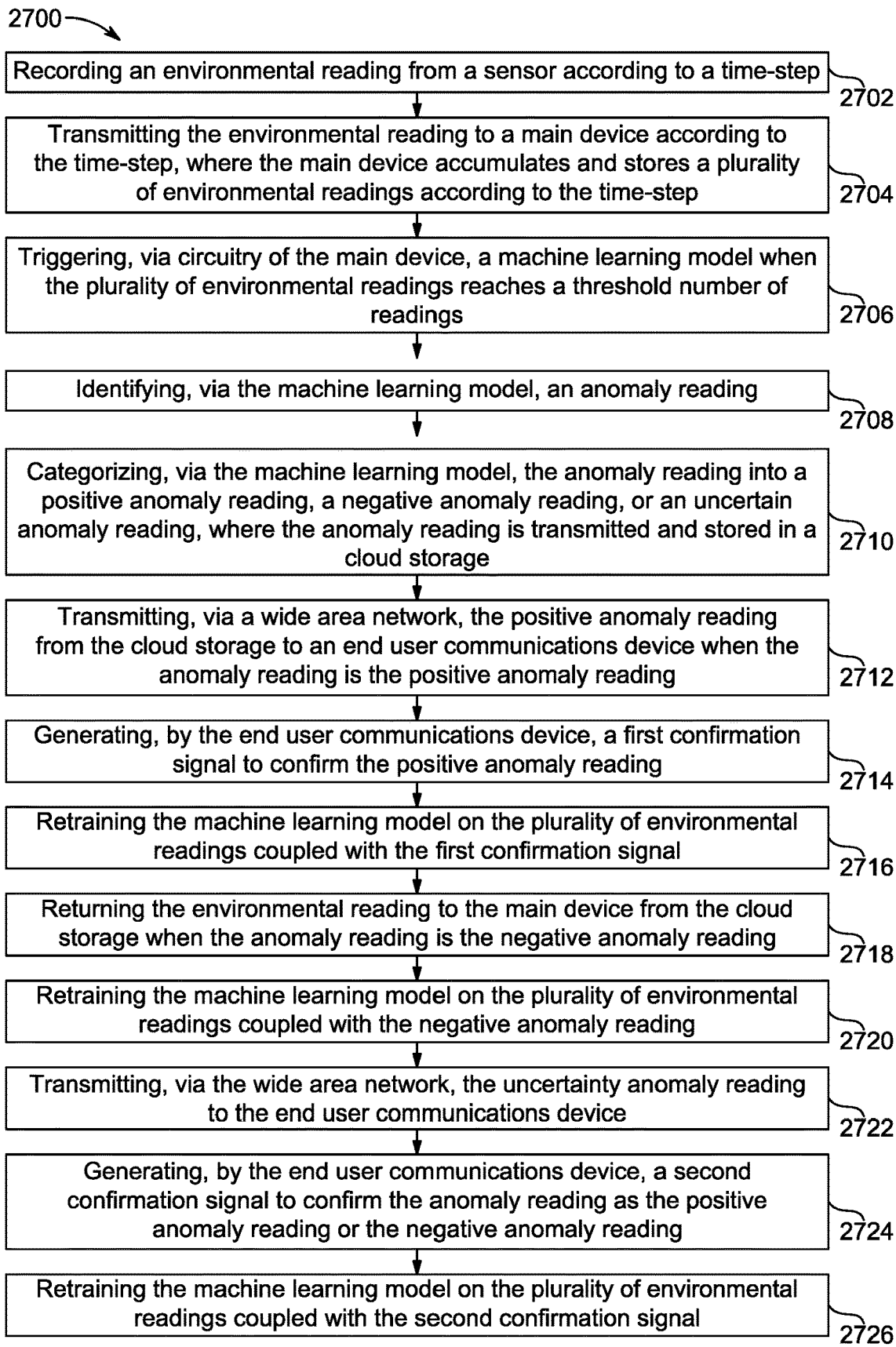
FIG. 27 is a flowchart of a method of anomaly detection, according to certain embodiments.

FIG. 27 is a flowchart of a method 2700 of anomaly detection, according to an aspect of the present disclosure. Some or all of the steps (or other processes described herein, or variations, and/or combinations thereof) herein may be performed under a control of one or more computer systems or controller configured with executable instructions and may be implemented as code (for example, executable instructions, one or more computer programs, or one or more applications) executing collectively on one or more processors, by hardware or combinations thereof. The code may be stored on a computer-readable storage medium, for example, in form of a computer program including instructions executable by the one or more processors. The computer-readable storage medium is non-transitory. In some embodiments, one or more (or all) of the steps of the method 2700 may be performed by the main device 124 with the aid of the trained machine learning model.

As used herein, the term "controller" may refer to any computing device, such as a computer, a laptop, a desktop, a cloud server, or the like. As will be appreciated by a person skilled in the art, the controller may include a processor, a machine learning module, and a storage. The processor may be any logic circuitry, such as an integrated circuit (IC) that receives (or fetches) instructions from a memory and processes the instructions and generates output. In some embodiments, the processor may be a microprocessor unit or a microcontroller unit. Some examples of microprocessor unit may include Intel processor (manufactured by Intel Corporation of Mountain View, California), Advanced Micro Devices processor (manufactured by Advanced Micro Devices of Sunnyvale, California), Snapdragon processor (manufactured by Qualcomm, San Diego, California, United States) and such processors. In some embodiments, the processor may be high performance processor configured to handle process intensive instructions associated with machine learning (ML) and artificial intelligence (AI). Examples of high-performance processor include AMD Rayzen (manufactured by Advanced Micro Devices of Sunnyvale, California), and Intel Core i9-i9 (manufactured by Intel Corporation of Mountain View, California). The processor may be a single core processor or a multi-core processor that is capable of handling instruction level parallelism and thread level parallelism and having different levels of cache.

As used herein, the term "memory" refers to a data storage unit having one or more memory chips capable of storing data and allowing any storage location to be directly accessed by the processing circuitry. The memory may be a Dynamic Random-Access Memory (DRAM) or any variants. In some embodiments, the memory may be a volatile memory or a non-volatile memory. The processing circuitry may communicate with the memory through IC interconnects (not shown).

As used herein, the phrase "trained machine learning model" (or machine learning module) may include a suitable hardware, set of instructions, or combination of hardware and instructions to support and enable the microprocessor 128 (see FIG. 1) of the main device 124 to learn and improve from experience without being explicitly programmed. Although the trained machine learning model is described as a part of the main device 124, in some implementations, the trained machine learning model may be external to the main device 124 and communicatively coupled to the microprocessor 128.

The method 2700 is described in conjunction with FIG. 1. At step 2702, the method 2700 includes recording an environmental reading from a sensor according to a time-step. In an embodiment, the microcontroller 144 in the sensor 102 records the readings from the sensing unit 150.

At step 2704, the method 2700 includes transmitting the environmental reading to a main device according to the time-step. In an embodiment, the microcontroller 144 may transmit the values of the readings to the access point 156 of the main device 124, where the main device 124 accumulates and stores multiple readings according to the time-step.

At step 2706, the method 2700 includes triggering, via a circuitry of the main device 124, a machine learning model when the plurality of environmental readings reaches a threshold number of readings. In an embodiment, when the readings gathered from the sensor 102 reaches the threshold number of readings, for example 1000 readings, the microprocessor 128 of the main device 124 may trigger the trained machine learning model.

At step 2708, the method 2700 includes identifying, via the machine learning model, an anomaly reading. Upon such triggering, the trained machine learning model may identify the anomaly reading. In an embodiment, the anomaly detection model may be used. The anomaly detection model may be one of Clustering, SVM, or Isolation Forest.

At step 2710, the method 2700 includes categorizing, via the machine learning model, the anomaly reading into a positive anomaly reading, a negative anomaly reading, or an uncertain anomaly reading. In an embodiment, trained machine learning model may categorize the anomaly reading into the positive reading indicating an anomaly, the negative reading indicating a normal state, or the uncertain reading which requires the user to confirm the anomaly. The anomaly readings may be transmitted and stored in the cloud storage 152.

At step 2712, the method 2700 includes transmitting, via a wide area network, the positive anomaly reading from the cloud storage 152 to the end user communications device 154 when the anomaly reading is the positive anomaly reading.

At step 2714, the method 2700 includes generating, by the end user communications device 154, a first confirmation signal to confirm the positive anomaly reading. In an embodiment, the user may be allowed to confirm the positive anomaly reading as an anomaly. For example, movement of a store keeper in the indoor greenhouse 1900 may be reported as the positive anomaly reading, and the user may reject such readings as anomaly since the user is aware of such movements.

At step 2716, the method 2700 includes retraining the machine learning model on the plurality of environmental readings coupled with the first confirmation signal. Based on the feedback from the user, the machine learning model may be retained to consider such movements as normal, so that similar data points in future are not reported as anomalies to the user.

At step 2718, the method 2700 includes returning the environmental reading to the main device 124 from the cloud storage 152 when the anomaly reading is the negative anomaly reading.

At step 2720, the method 2700 includes retraining the machine learning model on the plurality of environmental readings coupled with the negative anomaly reading.

At step 2722, the method 2700 includes transmitting, via the wide area network, the uncertainty anomaly reading to the end user communications device 154.

At step 2724, the method 2700 includes generating, by the end user communications device 154, a second confirmation signal to confirm the uncertainty anomaly reading as the positive anomaly reading or the negative anomaly reading.

At step 2726, the method 2700 includes retraining the machine learning model on the plurality of environmental readings coupled with the second confirmation signal.

To this end, the present disclosure provides system 100 and method 2700 to detect anomalies in an adaptable way, while maintaining user privacy. The present disclosure helps users who are reluctant to install surveillance cameras that may be a cause for users' annoyance or apprehension about the security breach. Besides detecting anomalies as soon as they occur, the system 100 and method 2700 of the present disclosure are effective in revealing the facts of disasters when they occur, through the data that is collected about the surroundings in that instance.

As used herein, the terms "a" and "an" and the like carry the meaning of "one or more."

Numerous modifications and variations of the present invention are possible in light of the above teachings. It is, therefore, to be understood that, within the scope of the appended claims, the invention may be practiced otherwise than as specifically described herein.

The invention claimed is:

1. An anomaly detection system, comprising:
a plurality of sensors;
a main device;
and a cloud storage;
wherein the plurality of sensors are fixed within a user-selected environment,
the plurality of sensors being configured to measure a plurality of environmental conditions within the user-selected environment and wirelessly transmit the plurality of environmental conditions to the main device;
wherein the main device includes circuitry encoded with instructions from a trained machine learning model to identify a plurality of one or more anomalies derived from the plurality of environmental conditions,
wherein the main device is configured to transmit the plurality of one or more anomalies and the plurality of environmental conditions to the cloud storage via a plurality of wired and wireless connections;
wherein the plurality of one or more anomalies and the plurality of environmental conditions are stored at the cloud storage,
wherein the cloud storage is in wireless communication with an end user communications device and is configured to relay the plurality of one or more anomalies to the end user communications device,
wherein the end user communications device is configured to communicate to a user the plurality of one or more anomalies,
wherein the end user communications device is in wireless communication with the cloud storage and is configured to relay a feedback signal, via the cloud storage, to the trained machine learning model,
wherein the circuitry of the main device includes instructions to incorporate the feedback signal into the trained machine learning model and to retrain the trained machine learning model with the feedback signal.

2. The anomaly detection system of claim 1, wherein each of the plurality of sensors comprises:
a microcontroller;
a chargeable battery;
a low power consumption signal,
wherein the low power consumption signal includes a wireless transmitter configured to transmit a low power signal to the cloud storage;
and a sensing unit configured to measure each environmental condition of the plurality of environmental conditions;
the sensing unit being electronically connected to the microcontroller,
wherein the sensing unit and the microcontroller are each configured to wirelessly output each of the plurality of environmental conditions to the main device according to a time-step update.

3. The anomaly detection system of claim 2, wherein the plurality of sensors comprises a dust sensor, a gas sensor, a force sensor, a humidity sensor, a sound sensor, and a vibration sensor all disposed in a common semi-enclosed space having an impermeable bottom and walls and an at least partially permeable top.

4. The anomaly detection system of claim 2, wherein each sensor of the plurality of sensors measures an environmental condition selected from the plurality of environmental conditions, wherein the plurality of environmental conditions are selected from a group consisting of a dust level, a pressure level, a gas level, a humidity level, a temperature level, a light level, a moisture level, a sound level, a vibration level, and a water level;
wherein each sensor of the plurality of sensors is configured to wirelessly transmit the environmental condition to the trained machine learning model of the main device,
the trained machine learning model identifying an anomaly corresponding to the environmental condition.

5. The anomaly detection system of claim 1, wherein the main device comprises:
a motherboard;
a microprocessor;
a memory unit;
a local storage drive;
a chargeable battery;
a feature signal receiver;
a wireless fidelity (WiFi) connection unit;
a cellular connection unit;
and an ethernet connection;
wherein the feature signal receiver is configured to receive the plurality of environmental conditions from the plurality of sensors,
wherein the local storage drive is configured to store the plurality of environmental conditions,
wherein the main device connects to the cloud storage via the WiFi connection unit, via the cellular connection unit, and via the ethernet connection.

6. The anomaly detection system of claim 1, wherein the plurality of sensors and the main device are connected via a local communication network,
wherein the main device and cloud storage are connected to the end user communications device via a wide area network.

7. The anomaly detection system of claim 1, wherein the main device includes an access point configured to detect a broadcasting signal output by a new sensor,
wherein the access point is configured to scans and authenticates the new sensor upon detection of the broadcasting signal, and
wherein the circuitry of the main device includes instructions to integrate the new sensor into the plurality of sensors.

8. The anomaly detection system of claim 1, wherein a location of the main device is outside the user-selected environment.

9. The anomaly detection system of claim 1, wherein the user-selected environment is defined by a distribution of the plurality of sensors and a sensory range of the plurality of sensors,
wherein the sensory range of the plurality of sensors is restricted by the main device to a boundary of the user-selected environment.

10. A method of anomaly detection, comprising:
recording an environmental reading from a sensor according to a time-step;
transmitting the environmental reading to a main device according to the time-step, wherein the main device accumulates and stores a plurality of environmental readings according to the time-step,
triggering, via circuitry of the main device, a machine learning model when a count of the plurality of environmental readings reaches a threshold number of readings;
identifying, via the machine learning model, an anomaly reading;
categorizing, via the machine learning model, the anomaly reading into a positive anomaly reading, a negative anomaly reading, or an uncertain anomaly reading, wherein the anomaly reading is transmitted and stored in a cloud storage;
transmitting, via a wide area network, the positive anomaly reading from the cloud storage to an end user communications device when the anomaly reading is the positive anomaly reading, wherein the end user communications device generates a first confirmation signal to confirm the positive anomaly reading, wherein the machine learning model is retrained on the plurality of environmental readings coupled with the first confirmation signal;
returning the environmental reading to the main device from the cloud storage when the anomaly reading is the negative anomaly reading, wherein the machine learning model is retrained on the plurality of environmental readings coupled with the negative anomaly reading;
transmitting, via the wide area network, the uncertainty anomaly reading to the end user communications device, wherein the end user communications device generates a second confirmation signal to confirm the anomaly reading as the positive anomaly reading or the negative anomaly reading;
wherein the machine learning model is retrained on the plurality of environmental readings coupled with the second confirmation signal.

11. The method of claim 10, wherein the machine learning model utilizes one of three detection models,
wherein the main device is configured to select one of the three detection models consisting of a k-means clustering algorithm, a support vector machine algorithm, and an isolation forest algorithm, according to an input signal received from the end user communications device.

12. The method of claim 10, wherein the time-step adheres to a default time range of five minutes, wherein the default time range is modified by a first command signal, a second command signal, or a third command signal received by the end user communications device, the first command signal increasing the default time range, the second command signal maintaining the default time range, the third command signal decreasing the default time range.

13. The method of claim 10, wherein the main device includes an access point configured to detect a broadcasting signal output by a new sensor, wherein the new sensor records a new environmental reading, wherein upon detection of the broadcasting signal the access point scans the new sensor and authenticates the new sensor, the main device establishing a wireless connection with the new sensor and integrating the new environmental reading into the machine learning model.

14. The method of claim 13, wherein the access point detects the broadcasting signal in parallel with the machine learning model.

15. The method of claim 10, wherein the cloud storage is connected to the end user communications device by the wide area network.

16. The method of claim 10, wherein the cloud storage stores:

the plurality of environmental readings;

the anomaly reading;

and a user account configured to be accessible by the end user communications device;

wherein the cloud storage relays a plurality of command signals from the user account to the main device.

17. The method of claim 10, wherein the machine learning model is triggered when the count of the plurality of environmental readings reaches a threshold number of readings of 1,000.

18. The method of claim 10, wherein the main device comprises a Raspberry pi device containing circuitry to implement the machine learning model.

19. The method of claim 10, wherein the sensor comprises a temperature measuring device.

* * * * *